United States Patent
Katami et al.

(10) Patent No.: US 9,175,194 B2
(45) Date of Patent: Nov. 3, 2015

(54) ACRYLIC PRESSURE-SENSITIVE ADHESIVE TAPE

(71) Applicant: NITTO DENKO CORPORATION, Ibaraki-shi (JP)

(72) Inventors: Hirofumi Katami, Osaka (JP); Takahiro Nonaka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 24 days.

(21) Appl. No.: 13/759,160

(22) Filed: Feb. 5, 2013

(65) Prior Publication Data

US 2013/0203941 A1    Aug. 8, 2013

(30) Foreign Application Priority Data

Feb. 6, 2012  (JP) .................. 2012-022615

(51) Int. Cl.
*C09J 133/14*  (2006.01)
*C09J 133/06*  (2006.01)

(52) U.S. Cl.
CPC ............ *C09J 133/14* (2013.01); *C09J 133/066* (2013.01)

(58) Field of Classification Search
CPC ...... C09J 133/066; C09J 133/14; C08L 33/08
USPC .......... 525/191, 221, 222, 227, 228; 526/319, 526/320, 328
See application file for complete search history.

(56) References Cited

U.S. PATENT DOCUMENTS

| | | | |
|---|---|---|---|
| 3,886,126 A | 5/1975 | McKenna, Jr. | |
| 6,783,850 B2 * | 8/2004 | Takizawa et al. | 428/355 AC |
| 7,374,815 B2 * | 5/2008 | Okochi et al. | 428/423.1 |
| 8,318,852 B2 | 11/2012 | Kim et al. | |
| 8,883,926 B2 | 11/2014 | Okamoto et al. | |
| 8,945,710 B2 | 2/2015 | Kishioka et al. | |
| 2003/0008140 A1 | 1/2003 | Takizawa et al. | |
| 2003/0232192 A1 | 12/2003 | Kishioka et al. | |
| 2004/0191509 A1 | 9/2004 | Kishioka et al. | |
| 2007/0117918 A1 | 5/2007 | Kim et al. | |
| 2009/0162617 A1 | 6/2009 | Moroishi et al. | |
| 2012/0189835 A1 * | 7/2012 | Takarada et al. | 428/220 |
| 2012/0328800 A1 * | 12/2012 | Yoon et al. | 428/1.55 |
| 2012/0328873 A1 | 12/2012 | Kishioka et al. | |
| 2012/0329970 A1 | 12/2012 | Kishioka et al. | |
| 2013/0005910 A1 | 1/2013 | Okamoto et al. | |
| 2013/0005911 A1 | 1/2013 | Okamoto et al. | |
| 2013/0274419 A1 | 10/2013 | Okamoto et al. | |

FOREIGN PATENT DOCUMENTS

| | | |
|---|---|---|
| CN | 1737074 A | 2/2006 |
| JP | 2003-238915 A | 8/2003 |
| JP | 2003-342542 A | 12/2003 |
| JP | 2004-231723 A | 8/2004 |
| JP | 2009-75595 A | 4/2009 |
| JP | 2011-202012 A | 10/2011 |
| JP | 2012-4127 A | 1/2012 |
| WO | 2007/058493 A1 | 5/2007 |
| WO | 2011/111575 A1 | 9/2011 |
| WO | 2011/118183 A1 | 9/2011 |
| WO | WO-2011105878 A1 * | 9/2011 |

OTHER PUBLICATIONS

Peykova, Y. et al. International Journal of Adhesion & Adhesives vol. 34 pp. 107-116 available online Dec. 2011.*
Office Action, Issued by the State Intellectual Property Office of P.R. China, Dated Mar. 10, 2015, in counterpart Chinese Application No. 201310048492.7.
Communication drafted Jul. 2, 2015 issued by Japanese Intellectual Property Office in counterpart Japanese Application No. 2012-022615.

* cited by examiner

*Primary Examiner* — Irina S Zemel
*Assistant Examiner* — Jeffrey Lenihan
(74) *Attorney, Agent, or Firm* — Sughrue Mion, PLLC

(57) ABSTRACT

An acrylic pressure-sensitive adhesive tape including an acrylic pressure-sensitive adhesive layer, wherein a 180° peel adhesive force of the acrylic pressure-sensitive adhesive tape to a glass plate is 10 N/20 mm or more and a 180° peel adhesive force of the acrylic pressure-sensitive adhesive tape to an acrylic plate is 10 N/20 mm or more. The acrylic pressure-sensitive adhesive layer contains an acrylic polymer (A), has a gel fraction of 65% or more, and has a 300% tensile residual stress of from 7 to 16 $N/cm^2$.

4 Claims, 2 Drawing Sheets

ACRYLIC PRESSURE-SENSITIVE ADHESIVE TAPE

BACKGROUND OF THE INVENTION

1. Technical Field

The present invention relates to an acrylic pressure-sensitive adhesive tape.

2. Background Art

Recently, display devices such as liquid crystal displays (LCDs) or input devices, such as a touch panel, which is used by combining the display device has been widely used in various fields. In manufacturing the display devices or the input devices, a pressure-sensitive adhesive tape (pressure-sensitive adhesive sheet) is used for laminating optical members. For example, a transparent pressure-sensitive adhesive tape is used for laminating a touch panel to various display device or optical member (protective plate or the like) (see, for example, Patent Documents 1 to 3).

With the spread of an embodiment for use of the foregoing display device or input device, a pressure-sensitive adhesive tape to be used for such a device is required to exhibit high adhesive reliability under, in addition to a normal state, a variety of environments. Specifically, the pressure-sensitive adhesive tape is required to exhibit high adhesive reliability even under a high-temperature environment.

Patent Document 1: JP-A-2003-238915
Patent Document 2: JP-A-2003-342542
Patent Document 3: JP-A-2004-231723

SUMMARY OF THE INVENTION

In recent years, materials of plastic adherends to be used for the foregoing display device or input device have changed, and in addition to conventional polyethylene terephthalate (PET), optically isotropic materials (for example, cycloolefin (COP), polycarbonate (PC), polymethyl methacrylate (PMMA), etc.) have been used. However, there is a concern that, in the foregoing pressure-sensitive adhesive tape, foaming or release is caused at an interface with a plastic adherend constituted of an optically isotropic material under a high-temperature environment, so that the adhesive reliability is not obtainable. For example, in the case where the foregoing pressure-sensitive adhesive tape is laminated to a polymethyl methacrylate resin-made adherend, there is a concern that, in the pressure-sensitive adhesive tape, foaming is caused by an extraneous material at an interface with the adherend due to unreacted monomers contained in the adherend under a high-temperature environment, so that the adhesive reliability is not obtainable. In addition, in the case where the foregoing pressure-sensitive adhesive tape is laminated to a polycarbonate-made adherend, there is a concern that, in the pressure-sensitive adhesive tape, foaming or release is caused at an interface with the adherend by water contained in the adherend and an outgas by carbon dioxide under a high-temperature environment, so that the adhesive reliability is not obtainable.

In addition, the foregoing pressure-sensitive adhesive tape is used for lamination between a glass adherend (for example, a glass plate, a glass lens or the like) and a plastic adherend. However, there is involved such a problem that, in the foregoing pressure-sensitive adhesive tape, lift-off or release is liable to be caused against the plastic adherend constituted of an optically isotropic material under a high-temperature environment. This is because the plastic adherend constituted of an optically isotropic material has a large coefficient of linear expansion as compared with the conventional polyethylene terephthalate (PET), and hence, a large stress is applied to the pressure-sensitive adhesive tape, and the stress may not be relieved. In particular, if the glass adherend is subjected to decorative printing, lift-off or release is more liable to be caused in a step portion between the glass adherend and the printed part. This is because the pressure-sensitive adhesive tape may not follow up the step portion.

In addition to the above, in the glass adherend having been subjected to decorative printing, the thickness of the printed part tends to become large due to an advance of design properties, and the step portion between the glass adherend and the printed part tends to become large. Accordingly, the pressure-sensitive adhesive tape is required to have excellent step followability (followability to the step).

In consequence, an object of the present invention is to provide a pressure-sensitive adhesive tape which is excellent in adhesive property and anti-foaming release property (characteristics that foaming or release is hardly caused at an interface between a pressure-sensitive adhesive tape and an adherend under a high-temperature environment) and furthermore, is excellent in step followability.

Then, the present inventors made extensive and intensive investigations. As a result, it has been found that by forming an acrylic pressure-sensitive adhesive tape including an acrylic pressure-sensitive adhesive layer having a gel fraction of a specified value or more and a 300% tensile residual stress falling within a specified range, and having a 180° peel adhesive force to each of a glass plate and an acrylic plate of a specified value or more, an acrylic pressure-sensitive adhesive tape having excellent adhesive property and excellent anti-foaming release property and furthermore, having excellent step followability is obtained. The present invention has been accomplished on the basis of such knowledge.

The present invention provides an acrylic pressure-sensitive adhesive tape including an acrylic pressure-sensitive adhesive layer, wherein: a 180° peel adhesive force of the acrylic pressure-sensitive adhesive tape to a glass plate is 10 N/20 mm or more; a 180° peel adhesive force of the acrylic pressure-sensitive adhesive tape to an acrylic plate is 10 N/20 mm or more; the acrylic pressure-sensitive adhesive layer contains an acrylic polymer (A); the acrylic pressure-sensitive adhesive layer has a gel fraction of 65% or more; and the acrylic pressure-sensitive adhesive layer has a 300% tensile residual stress of from 7 to 16 $N/cm^2$.

In the acrylic pressure-sensitive adhesive tape, the acrylic polymer (A) preferably contains, as a monomer unit, a monomer having a hydroxyl group in a molecule thereof.

In the acrylic pressure-sensitive adhesive tape, the acrylic pressure-sensitive adhesive layer preferably further contains an acrylic polymer (B) having a weight average molecular weight of from 1,000 to 30,000.

The acrylic pressure-sensitive adhesive tape is preferably an optical pressure-sensitive adhesive tape.

The acrylic pressure-sensitive adhesive tape of the present invention includes an acrylic pressure-sensitive adhesive layer having a gel fraction of a specified value or more, and hence, it is excellent in anti-foaming release property; and the acrylic pressure-sensitive adhesive tape of the present invention includes an acrylic pressure-sensitive adhesive layer having a 300% tensile residual stress falling within a specified range, and hence, it is excellent in step followability. In addition, the acrylic pressure-sensitive adhesive tape of the present invention has a 180° peel adhesive force to each of a glass plate and an acrylic plate of a specified value or more, and hence, it is excellent in adhesive property. In consequence, the acrylic pressure-sensitive adhesive tape of the present invention is excellent in adhesive reliability, especially adhesive reliability at high temperatures. In particular, the acrylic pressure-sensitive adhesive tape of the present invention is useful for lamination between a glass adherend and a plastic adherend.

DETAILED DESCRIPTION OF THE INVENTION

Figure 1:
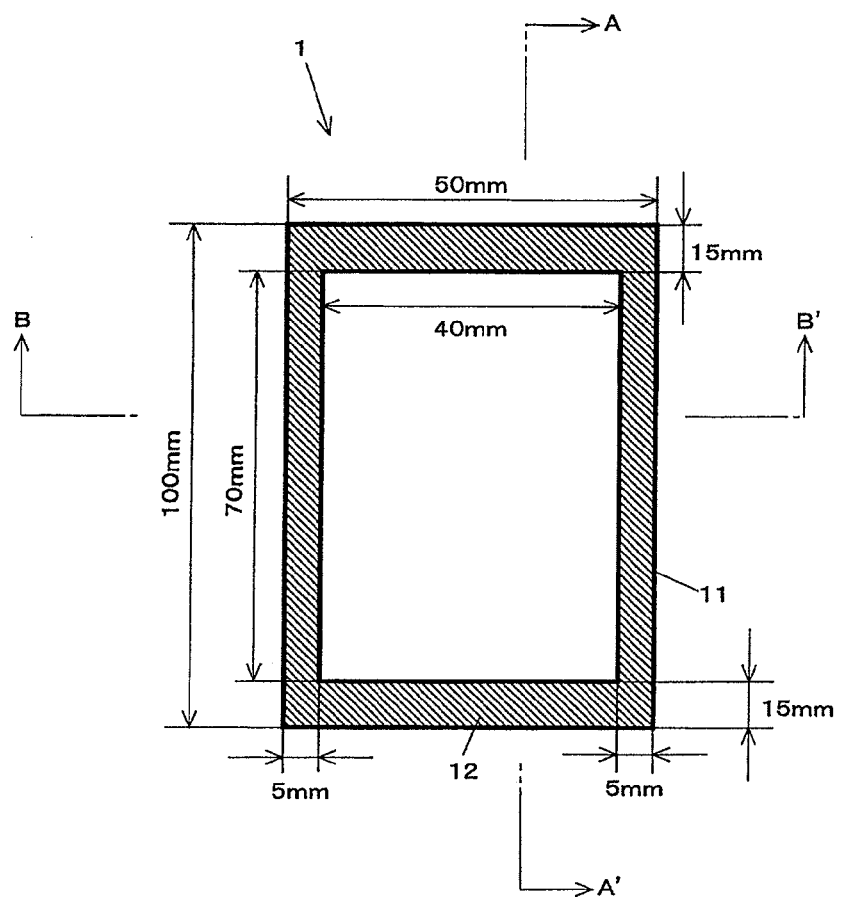
FIG. 1 is a top view of a glass with step.

The acrylic pressure-sensitive adhesive tape of the present invention includes at least one acrylic pressure-sensitive adhesive layer. The acrylic pressure-sensitive adhesive layer is a pressure-sensitive adhesive layer containing an acrylic polymer (A) and having a gel fraction of 65% or more and a 300% tensile residual stress of from 7 to 16 N/cm$^2$. In the present specification, the foregoing acrylic pressure-sensitive adhesive layer is sometimes referred to as "pressure-sensitive adhesive layer of the present invention".

The acrylic pressure-sensitive adhesive tape of the present invention may be a double-sided pressure-sensitive adhesive tape having pressure-sensitive adhesive layer surfaces on both surfaces thereof, or may be a single-sided pressure-sensitive adhesive tape having a pressure-sensitive adhesive layer surface on only one surface thereof. Among them, from the viewpoint of laminating two members each other, the double-sided pressure-sensitive adhesive tape is preferable. The "pressure-sensitive adhesive tape" in the present specification also encompasses a sheet shaped one, that is, "pressure-sensitive adhesive sheet". In addition, the pressure-sensitive adhesive layer surface in the present specification is sometimes referred to as a "pressure-sensitive adhesive surface".

In the acrylic pressure-sensitive adhesive tape of the present invention, a separator (release liner) may be provided on the pressure-sensitive adhesive surface until it is used.

The acrylic pressure-sensitive adhesive tape of the present invention may be a substrateless type pressure-sensitive adhesive tape that does not have substrate (substrate layer) (hereinafter may be referred to as "substrateless pressure-sensitive adhesive tape)", or a pressure-sensitive adhesive sheet with a substrate (hereinafter may be referred to as "pressure-sensitive adhesive tape with substrate"). Examples of the substrateless pressure-sensitive adhesive tape include a double-sided pressure-sensitive adhesive tape consisting of the pressure-sensitive adhesive layer of the present invention, double-sided pressure-sensitive adhesive tape consisting of the pressure-sensitive adhesive layer of the present invention and a pressure-sensitive adhesive layer other than the pressure-sensitive adhesive layer of the present invention (may be referred to as "other pressure-sensitive adhesive layer"), and the like. On the other hand, examples of the pressure-sensitive adhesive tape with substrate include a pressure-sensitive adhesive tape including a substrate and the pressure-sensitive adhesive layer of the present invention on at least one surface of the substrate, and the like. Among them, the substrateless pressure-sensitive adhesive tape (substrateless double-sided pressure-sensitive adhesive tape) is preferable, and the substrateless double-sided pressure-sensitive adhesive tape consisting of the pressure-sensitive adhesive layer of the present invention is more preferable. The "substrate (substrate layer)" does not include a separator to be released when it is used (laminated).

The 180° peel adhesive force of the acrylic pressure-sensitive adhesive tape of the present invention to a glass plate is 10 N/20 mm or more, preferably 12 N/20 mm or more, and more preferably 14 N/20 mm or more. The acrylic pressure-sensitive adhesive tape of the present invention has a 180° peel adhesive force to a glass plate of 10 N/20 mm or more, and hence, it is excellent in adhesive property to glass and excellent in suppression of lift-off in a step. An upper limit of the 180° peel adhesive force of the acrylic pressure-sensitive adhesive tape of the present invention to a glass plate is not particularly limited. For example, the upper limit of the 180° peel adhesive force to a glass plate is preferably 60 N/20 mm, and more preferably 40 N/20 mm. The 180° peel adhesive force to a glass plate is determined by a measuring method of 180° peel adhesive force as described later.

Though the glass plate is not particularly limited, examples thereof include a trade name "SODA LIME GLASS #0050" (manufactured by Matsunami Glass Ind. Ltd.). In addition, examples thereof include alkali-free glasses and chemically strengthened glasses.

The 180° peel adhesive force of the acrylic pressure-sensitive adhesive tape of the present invention to an acrylic plate is 10 N/20 mm or more, preferably 12 N/20 mm or more, and more preferably 14 N/20 mm or more. The acrylic pressure-sensitive adhesive tape of the present invention has a 180° peel adhesive force to an acrylic plate of 10 N/20 mm or more, and hence, it is excellent in adhesive property to an acrylic plate and excellent in suppression of lift-off in a step. An upper limit of the 180° peel adhesive force of the acrylic pressure-sensitive adhesive tape of the present invention to an acrylic plate is not particularly limited. For example, the upper limit of the 180° peel adhesive force to an acrylic plate is preferably 60 N/20 mm, and more preferably 40 N/20 mm. The 180° peel adhesive force to an acrylic plate is determined by a measuring method of 180° peel adhesive force as described later.

Though the acrylic plate is not particularly limited, examples thereof include a PMMA plate (trade name: "ACRYLITE", manufactured by Mitsubishi Rayon Co., Ltd.).

[Measuring Method of 180° Peel Adhesive Force]

A pressure-sensitive adhesive surface of a pressure-sensitive adhesive tape is laminated to an adherend, and the laminate is contact-bonded by moving a 2-kg roller back and forth once and then aged in an atmosphere at 23° C. and 50% RH for 30 minutes. After aging, the pressure-sensitive adhesive tape is peeled off from the adherend in an atmosphere at 23° C. and 50% RH under the conditions at a tensile speed of 300 mm/min and a peel angle of 180° in conformity with JIS Z0237, thereby measuring a 180° peel adhesive force (N/20 mm).

As described above, in the acrylic pressure-sensitive adhesive tape of the present invention, both of the 180° peel adhesive force to a glass plate and the 180° peel adhesive force to an acrylic plate are 10 N/20 mm or more, and hence, the acrylic pressure-sensitive adhesive tape of the present invention is excellent in adhesive property to adherends of various kinds of materials and excellent in suppression of lift-off in a step. Accordingly, the acrylic pressure-sensitive adhesive tape of the present invention is useful for lamination of adherends of various kinds of materials to each other, and in particular, it is useful for lamination between a glass adherend and a plastic adherend.

Though a thickness (total thickness) of the acrylic pressure-sensitive adhesive tape of the present invention is not particularly limited, it is preferably from 50 to 600 μm, and more preferably from 75 to 500 μm. When the thickness of the acrylic pressure-sensitive adhesive tape is 50 μm or more, in view of the fact that a printing step is liable to be relaxed, release in a step portion is hardly caused, and hence, such is preferable. In addition, when the thickness of the acrylic pressure-sensitive adhesive tape is 600 μm or less, an excellent appearance is liable to be kept during the tape manufacture, and hence, such is preferable. The thickness of the acrylic pressure-sensitive adhesive tape of the present invention does not include a thickness of the separator.

Though a haze of the acrylic pressure-sensitive adhesive tape of the present invention (in conformity with JIS K7136) is not particularly limited, it is preferably 3.0% or less, and more preferably 1.5% or less. When the haze of the acrylic pressure-sensitive adhesive tape is 3.0% or less, excellent transparency and excellent appearance are obtained, and hence, such is preferable. For example, the haze can be determined by measuring a sample prepared by laminating the pressure-sensitive adhesive tape, which has been allowed to stand in a normal state (at 23° C. and 50% RH) for at least 24 hours, and in which in the case of having a separator, this has been then released, to a slide glass (for example, one having a total light transmittance of 91.8% and a haze of 0.4%), by using a haze meter (trade name: "HM-150", manufactured by Murakami Color Research Laboratory Co., Ltd.).

Though a total light transmittance in a visible light wavelength region of the acrylic pressure-sensitive adhesive tape of the present invention (in conformity with JIS K7361-1) is not particularly limited, it is preferably 85% or more, and more preferably 88% or more. When the total light transmittance in a visible light wavelength region of the acrylic pressure-sensitive adhesive tape is 85% or more, excellent transparency and excellent appearance are obtained, and hence, such is preferable. For example, the total light transmittance can be determined by measuring a sample prepared by laminating the pressure-sensitive adhesive tape, which has been allowed to stand in a normal state (at 23° C. and 50% RH) for at least 24 hours, and in which in the case of having a separator, this has been then released, to a slide glass (for example, one having a total light transmittance of 91.8% and a haze of 0.4%), by using a haze meter (trade name: "HM-150", manufactured by Murakami Color Research Laboratory Co., Ltd.).

(Pressure-Sensitive Adhesive Layer of the Present Invention)

The pressure-sensitive adhesive layer of the present invention contains at least an acrylic polymer (A).

The gel fraction (proportion of a component insoluble in solvent) of the pressure-sensitive adhesive layer of the present invention is preferably from 65 to 99%, more preferably from 68 to 95%, and still more preferably from 70 to 95%. Since the gel fraction of the pressure-sensitive adhesive layer of the present invention is 65% or more, the cohesive force of the pressure-sensitive adhesive layer is enhanced, the foaming or release at an interface with the adherend under a high-temperature environment is suppressed, and the anti-foaming release property is excellent. When the gel fraction is 95% or less, appropriate flexibility is obtained, and the adhesive property is more enhanced, and hence, such is preferable.

The pressure-sensitive adhesive tape of the present invention includes the pressure-sensitive adhesive layer of the present invention having a high gel fraction, and hence, it is excellent in anti-foaming release property.

Specifically, the gel fraction (proportion of a component insoluble in solvent) is, for example, a value calculated by "Method of measuring gel fraction" to be described below.

(Method of Measuring Gel Fraction)

About 0.1 g of the acrylic pressure-sensitive adhesive layer is sampled from the pressure-sensitive adhesive tape, followed by wrapping with a porous tetrafluoroethylene sheet (trade name "NTF1122", manufactured by Nitto Denko Corporation) having an average pore size of 0.2 μm, and it is tied up with a kite string and at this time, it is measured for the weight, and the weight measured is designated as the weight before immersion. The weight before immersion is the total weight of the acrylic pressure-sensitive adhesive layer (acrylic pressure-sensitive adhesive sampled above), the tetrafluoroethylene sheet and the kite string. The total weight of the tetrafluoroethylene sheet and the kite string is also measured, and this weight is designated as the wrapper weight.

Subsequently, the acrylic pressure-sensitive adhesive layer wrapped with a tetrafluoroethylene sheet and tied up with a kite string (hereinafter referred to as the "sample") is put in a 50 ml-volume vessel filled with ethyl acetate, followed by allowing to stand still at 23° C. for 7 days. The sample (after ethyl acetate treatment) is then taken out of the vessel, and it is transferred to an aluminum-made cup, followed by drying in a dryer at 130° C. for 2 hours to remove ethyl acetate, and it is measured for the weight, and this weight is designated as the weight after immersion.

The gel fraction is calculated according to the following formula:

Gel fraction(wt %)=((X−Y)/(Z−Y))×100

(wherein X is the weight after immersion, Y is the wrapper weight, and Z is the weight before immersion).

The gel fraction can be controlled by, for example, a monomer composition or a weight average molecular weight of the acrylic polymer (A), a use amount (addition amount) of a crosslinking agent, or the like.

The 300% tensile residual stress of the pressure-sensitive adhesive layer of the present invention is from 7 to 16 N/cm$^2$, more preferably from 7 to 15 N/cm$^2$, and still more preferably from 7 to 14 N/cm$^2$. Since the 300% tensile residual stress of the pressure-sensitive adhesive layer is 7 N/cm$^2$ or more, a favorable anti-foaming release property is obtained, and hence, such is preferable. In addition, since the 300% tensile residual stress of the pressure-sensitive adhesive layer is 16 N/cm$^2$ or less, a favorable stress relaxation property is obtained, and favorable step followability is obtained.

The pressure-sensitive adhesive tape of the present invention includes the pressure-sensitive adhesive layer of the present invention in which the 300% tensile residual stress thereof falls within a specified range, and hence, it is excellent in stress relaxation property. Accordingly, the pressure-sensitive adhesive tape of the present invention exhibits excellent step followability. For example, the pressure-sensitive adhesive tape of the present invention is able to favorably follow up a large step (for example, a step having a height of about 45 μm, especially a step having a height of from 20 to 50 μm).

The 300% tensile residual stress is a value (N/cm$^2$) obtained by drawing the pressure-sensitive adhesive layer to an elongation (strain) of 300% in a length direction under an environment at 23° C., keeping that elongation, determining a tensile load applied to the pressure-sensitive adhesive layer after a lapse of 300 seconds after completion of drawing, and dividing the tensile load by an initial cross-sectional area of the pressure-sensitive adhesive layer (cross-sectional area before drawing). An initial elongation of the pressure-sensitive adhesive layer is 100%.

Though a thickness of the pressure-sensitive adhesive layer of the present invention is not particularly limited, it is preferably from 50 to 600 μM, and more preferably from 75 to 500 μm.

The pressure-sensitive adhesive layer of the present invention contains the acrylic polymer (A) as a main component. Though a content of the acrylic polymer (A) in the pressure-sensitive adhesive layer of the present invention is not particularly limited, it is preferably 75 wt % or more (for example, from 75 to 100 wt %), and more preferably 85 wt % or more (for example, from 85 to 100 wt %) relative to the total amount (total weight, i.e., 100 wt %) of the pressure-sensitive adhesive layer of the present invention.

The pressure-sensitive adhesive layer of the present invention is formed of an acrylic pressure-sensitive adhesive composition. The "pressure-sensitive adhesive composition" also includes the meaning of "composition for forming a pressure-sensitive adhesive".

The pressure-sensitive adhesive in the pressure-sensitive adhesive layer of the present invention may be a pressure-sensitive adhesive having any form. Examples thereof include an emulsion type pressure-sensitive adhesive, a solvent type pressure-sensitive adhesive, a hot melt type pressure-sensitive adhesive, an active energy ray-curable pressure-sensitive adhesive, and the like.

Accordingly, though the acrylic pressure-sensitive adhesive composition varies with a forming method of the pressure-sensitive adhesive layer and is not particularly limited, examples thereof include an acrylic pressure-sensitive adhesive composition containing the acrylic polymer (A) as an essential component; an acrylic pressure-sensitive adhesive composition containing a mixture of monomer components for forming the acrylic polymer (A) (sometimes referred to as "monomer mixture") or its partial polymerization product as an essential component. Though there are no particular limitations, examples of the former include a so-called solvent type pressure-sensitive adhesive composition; and examples of the latter include a so-called active energy ray-curing type pressure-sensitive adhesive composition. The acrylic pressure-sensitive adhesive composition may contain, in addition to the essential component (the acrylic polymer (A), or the monomer mixture for forming the acrylic polymer (A) or its partial polymerization product), other additives as the need arises.

The "monomer mixture" as referred to herein means a mixture composed of only monomer components for forming the acrylic polymer (A). In addition, the "partial polymerization product" as referred to herein means a composition obtained by partially polymerizing one or two or more components among the constituent components of the monomer mixture.

Among them, the acrylic pressure-sensitive adhesive composition is preferably an acrylic pressure-sensitive adhesive composition containing a monomer mixture or its partial polymerization product as an essential component.

(Acrylic Polymer (A))

The acrylic polymer (A) is a polymer including, as an essential monomer unit (monomer unit, monomer structural unit), an acrylic monomer. In other words, the acrylic polymer (A) includes a structural unit derived from an acrylic monomer as its structural unit. That is, the acrylic polymer (A) is a polymer constituted (formed) of an acrylic monomer as an essential monomer component. In the present specification, the term "(meth)acryl" represents "acryl" and/or "methacryl" (either one of or both of "acrylic" and "methacryl") and the same for the others.

The acrylic polymer (A) preferably includes, as an essential monomer unit, alkyl(meta)acrylate having a straight-chain or branched alkyl group (hereinafter may be referred to as "alkyl(meth)acrylate").

As the alkyl(meth)acrylate, examples thereof include alkyl (meth)acrylate of which an alkyl group has 1 to 20 carbon atoms, such as methyl(meth)acrylate, ethyl(meth)acrylate, propyl(meth)acrylate, isopropyl(meth)acrylate, butyl(meth)acrylate (n-butyl(meth)acrylate), isobutyl(meth)acrylate, s-butyl(meth)acrylate, t-butyl(meth)acrylate, pentyl(meth)acrylate, isopentyl(meth)acrylate, hexyl(meth)acrylate, heptyl(meth)acrylate, octyl(meth)acrylate, 2-ethylhexyl(meth)acrylate, isooctyl(meth)acrylate, nonyl(meth)acrylate, isononyl(meth)acrylate, decyl(meth)acrylate, isodecyl (meth)acrylate, undecyl(meth)acrylate, dodecyl(meth)acrylate, tridecyl(meth)acrylate, tetradecyl(meth)acrylate, pentadecyl(meth)acrylate, hexadecyl(meth)acrylate, heptadecyl (meth)acrylate, octadecyl(meth)acrylate, nonadecyl(meth)acrylate, and eicosyl(meth)acrylate. The alkyl(meth)acrylate may be used either alone or in combination of two or more thereof.

Among them, from the standpoints of increasing each of the 180° peel adhesive force to a glass plate and the 180° peel adhesive force to an acrylic plate to obtain a strong adhesive property and adjusting the 300% residual stress of the pressure-sensitive adhesive layer, the alkyl(meth)acrylate is preferably an alkyl(meth)acrylate having an alkyl group having from 1 to 14 carbon atoms, and more preferably methyl methacrylate (MMA), butyl acrylate (BA), or 2-ethylhexyl acrylate (2EHA).

Though a content (proportion) of the alkyl(meth)acrylate in the whole of the monomer units of the acrylic polymer (A) (total amount of the monomer components constituting the acrylic polymer (A)) is not particularly limited, from the standpoint of adhesive reliability, especially adhesive reliability at low temperatures, it is preferably from 30 to 95 wt %, more preferably from 35 to 90 wt %, and still more preferably from 40 to 85 wt % in the whole of the monomer units (100 wt %) of the acrylic polymer (A).

The acrylic polymer (A) may contain, in addition to the alkyl(meth)acrylate, a monomer capable of being copolymerized (copolymerizable monomer) as a monomer unit. The copolymerizable monomer may be used either alone or in combination of two or more thereof.

As the copolymerizable monomer, a monomer having a hydroxyl group in a molecule thereof is preferably exemplified. That is, it is preferable that the acrylic polymer (A) contains, as the monomer unit, a monomer having a hydroxyl group in a molecule thereof. When the acrylic polymer (A) contains, as the monomer unit, a monomer having a hydroxyl group in a molecule thereof, during the polymerization of the constituent monomer components, the polymerization is liable to be achieved, and a favorable cohesive force is liable to be obtained. Accordingly, by increasing the 180° peel adhesive force to a glass plate and the 180° peel adhesive force to an acrylic plate, a strong adhesive property is liable to be obtained, and by increasing the gel fraction, an excellent anti-foaming release property is liable to be obtained. Furthermore, whitening of the pressure-sensitive adhesive tape, which may possibly occur under a high-humidity environment, is liable to be suppressed.

The monomer having a hydroxyl group in a molecule thereof is a monomer having at least one hydroxyl group in a molecule (one molecule) thereof. In the present specification, the "monomer having a hydroxyl group in a molecule thereof" is sometimes referred to as "hydroxyl group-containing monomer".

As the hydroxyl group-containing monomers, examples thereof include hydroxyl group-containing (meth)acrylic acid ester such as 2-hydroxyethyl(meth)acrylate, 3-hydroxypropyl(meth)acrylate, 4-hydroxybutyl(meth)acrylate, 6-hydroxyhexyl(meth)acrylate, hydroxyoctyl(meth)acrylate, hydroxydecyl(meth)acrylate, hydroxylauryl(meth)acrylate, and (4-hydroxymethylcyclohexyl)(meth)arylate; vinyl alcohol and aryl alcohol. Among them, as the hydroyl group-containing monomer, hydroxyl group-containing (meth)acrylic acid ester is preferable, and, 2-hydroxyethyl(meth)acrylate (HEA) and 4-hydroxybutyl(meth)acrylate (4HBA) are more preferable. The hydroxyl group-containing monomer may be used either alone or in combination of two or more thereof.

Though a content (proportion) of the hydroxyl group-containing monomer in the whole of the monomer units of the acrylic polymer (A) is not particularly limited, it is preferably from 1 to 40 wt %, more preferably from 2 to 35 wt %, and still more preferably from 3 to 30 wt % in the whole of the monomer units (100 wt %) of the acrylic polymer (A). When the content of the hydroxyl group-containing monomer is 1 wt % or more, the whitening of the pressure-sensitive adhesive tape, which may possibly occur under a high-humidity environment, is more liable to be suppressed, and hence, such is preferable. In addition, when the content of the hydroxyl group-containing monomer is 40 wt % or less, an appropriate cohesive force is liable to be obtained, and excellent adhesive property and excellent anti-foaming release property are more liable to be obtained, and hence, such is preferable.

Furthermore, as the copolymerizable monomer, a monomer having a nitrogen atom in a molecule thereof is preferably exemplified. That is, it is preferable that the acrylic polymer (A) contains, as the monomer unit, a monomer having a nitrogen atom in a molecule thereof. When the acrylic polymer (A) contains, as the monomer unit, a monomer having a nitrogen atom in a molecule thereof, a favorable cohesive force is liable to be obtained. Accordingly, by increasing each of the 180° peel adhesive force to a glass plate and the 180° peel adhesive force to an acrylic plate, a strong adhesive property is liable to be obtained, and by increasing the gel fraction, an excellent anti-foaming release property is liable to be obtained. Furthermore, appropriate flexibility is liable to be obtained in the pressure-sensitive adhesive layer, and by adjusting the 300% tensile residual stress within a specified range, excellent stress relaxation property and excellent step followability are liable to be obtained.

The monomer having a nitrogen atom in a molecule thereof is a monomer having at least one nitrogen atom in a molecule (one molecule) thereof. In the present specification, the "monomer having a nitrogen atom in a molecule thereof" is sometimes referred to as "nitrogen atom-containing monomer". However, the nitrogen atom-containing monomer is not included in the meaning of the hydroxyl group-containing monomer. That is, in the present specification, the monomer having a hydroxyl group and a nitrogen atom in a molecule thereof is included in the meaning of the hydrogen group-containing monomer.

Examples of the nitrogen atom-containing monomer include N-vinyl cyclic amide, (meth)acrylamides and the like. The nitrogen atom-containing monomer may be used either alone or in combination of two or more thereof.

As the N-vinyl cyclic amide, examples thereof include an N-vinyl cyclic amide represented by the following formula (1).

[Chem. 1]

(1)

(In the formula (1), $R^1$ represents a divalent organic group)

In the formula (1), $R^1$ is a divalent organic group, preferably a divalent saturated hydrocarbon group or a divalent unsaturated hydrocarbon group, and more preferably a divalent saturated hydrocarbon group (for example, an alkylene group having 3 to 5 carbon atoms and the like).

Examples of the N-vinyl cyclic amide represented by the formula (1) include N-vinyl-2-pyrrolidone, N-vinyl-2-piperidone, N-vinyl-3-morpholinone, N-vinyl-2-caprolactam, N-vinyl-1,3-oxazine-2-one, N-vinyl-3,5-morpholine dione, and the like.

Examples of the (meth)acrylamides include (meth)acrylamide, N-alkyl(meth)acrylamide, N,N-dialkyl(meth)acrylamide and the like. Examples of the N-alkyl(meth)acrylamide include N-ethyl(meth)acrylamide, N-isopropyl(meth)acrylamide, N-n-butyl(meth)acrylamide, N-octyl acrylamide and the like. Examples of the N-alkyl(meth)acrylamide include (meth)acrylamide having an amino group, such as dimethylaminoethyl(meth)acrylamide, diethylaminoethyl(meth)acrylamide and dimethylaminopropyl(meth)acrylamide. Examples of the N,N-dialkyl(meth)acrylamide include N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide, N,N-di(t-butyl)(meth)acrylamide and the like.

Examples of the (meth)acrylamides also includes various N-hydroxyalkyl(meth)acrylamides. Examples of the N-hydroxyalkyl(meth)acrylamides include N-methylol(meth)acrylamide, N-(2-hydroxyethyl)(meth)acrylamide, N-(2-hydroxypropyl)(meth)acrylamide, N-(1-hydroxypropyl)(meth)acrylamide, N-(3-hydroxypropyl)(meth)acrylamide, N-(2-hydroxybutyl)(meth)acrylamide, N-(3-hydroxybutyl)(meth)acrylamide, N-(4-hydroxybutyl)(meth)acrylamide, N-methyl-N-2-hydroxyethyl(meth)acrylamide and the like.

Examples of the (meth)acrylamides also includes various N-alkoxyalkyl(meth)acrylamides. Examples of the N-alkoxyalkyl(meth)acrylamide include N-methoxymethyl(meth)acrylamide, N-butoxymethyl(meth)acrylamide and the like.

Examples of the nitrogen atom-containing monomer other than the N-vinyl cyclic amide and the (meth)acrylamides described above include an amino group-containing monomer such as aminoethyl(meth)acrylate, dimethylaminoethyl(meth)acrylate, dimethylaminopropyl(meth)acrylate and t-butylaminoethyl(meth)acrylate; a cyano group-containing monomer such as acrylonitrile and methacrylonitrile; a heterocyclic ring-containing monomer such as (meth)acryloyl morpholine, N-vinylpiperazine, N-vinylpyrrole, N-vinylimidazole, N-vinylpyrazine, N-vinylmorpholine, N-vinylpyrazole, vinylpyridine, vinylpyrimidine, vinyloxazole, vinylisoxazole, vinylthiazole, vinylisothiazole, vinylpyridazine, (meth)acryloyl pyrrolidone, (meth)acryloyl pyrrolidine, (meth)acryloyl piperidine and N-methylvinylpyrrolidone; an imide group-containing monomer, such as a maleimide-based monomer such as N-cyclohexylmaleimide, N-isopropylmaleimide, N-laurylmaleimide and N-phenylmaleimide, an itaconimide-based monomer such as N-methylitaconimide, N-ethylitaconimide, N-butylitaconimide, N-octylitaconimide, N-2-ethylhexylitaconimide, N-laurylitaconimide and N-cyclohexylitaconimide, a succinimide-based monomer such as N-(meth)acryloyloxymethylene succinimide, N-(meth)acryloyl-6-oxyhexamethylene succinimide and N-(meth)acryloyl-8-oxyoctamethylene succinimide; an isocyanate group-containing monomer such as 2-(meth)acryloyloxyethyl isocyanate; and the like.

Among them, from the viewpoint of improving anti-foaming release property, as the nitrogen atom-containing monomer, N-vinyl cyclic amide represented by the formula (1) and (meth)acrylamides are preferable; N-vinyl-2-pyrrolidone (NVP), N-vinyl-2-caprolactam, N,N-dimethyl(meth)acrylamide and N,N-diethyl(meth)acrylamide are more preferable; and N-vinyl-2-pyrrolidone is even more preferable.

Though a content (proportion) of the nitrogen atom-containing monomer in the whole of the monomer units of the acrylic polymer (A) is not particularly limited, it is preferably from 1 to 30 wt %, more preferably from 3 to 27 wt %, and still more preferably from 5 to 24 wt % in the whole of the monomer units (100 wt %) of the acrylic polymer (A). When the content of the nitrogen atom-containing monomer is 1 wt % or more, an appropriate cohesive force is liable to be obtained, and excellent adhesive property and excellent anti-foaming release property are more liable to be obtained, and hence, such is preferable. In addition, when the content of the nitrogen atom-containing monomer is 30 wt % or less, appropriate flexibility is liable to be obtained in the pressure-sensitive adhesive layer, and excellent stress relaxation property and excellent step followability are liable to be obtained, and hence, such is preferable.

It is preferable that a monomer having a carboxyl group in a molecule (one molecule) thereof (sometimes referred to as "carboxyl group-containing monomer") is not substantially contained as the monomer unit of the acrylic polymer (monomer component constituting the acrylic polymer (A)). In view of the fact that the carboxyl group-containing monomer is not substantially contained, even in the case where the pressure-sensitive adhesive tape of the present invention is laminated to a metal adherend (for example, an adherend having a metal surface on the surface thereof (especially a plastic adherend having a metal surface on the surface thereof), a metal-made adherend, etc.), such as a metal thin film and a metal oxide thin film (for example, ITO, etc.), such an adherend is hardly corroded, and for example, the conductive characteristics of a conductive film such as an ITO film are hardly lowered.

It is meant by the terms "not substantially contained" that it is not actively blended exclusive of the case where it is inevitably incorporated. Specifically, a content (proportion) of the carboxyl group-containing monomer in the whole of the monomer units of the acrylic polymer (A) is preferably 0.05 wt % or less (for example, from 0 to 0.05 wt %), more preferably 0.01 wt % or less (for example, from 0 to 0.01 wt %), and still more preferably 0.001 wt % or less (for example, from 0 to 0.001 wt %) in the whole of the monomer units (100 wt %) of the acrylic polymer (A). Examples of the carboxyl group-containing monomer include (meth)acrylic acid, itaconic acid, maleic acid, fumaric acid, crotonic acid, and isocrotonic acid. In addition, examples of the carboxyl group-containing monomer also includes an acid anhydride group-containing monomer such as maleic anhydride and itaconic anhydride.

Examples of the copolymerizable monomer in the acrylic polymer (A) include, in addition to the foregoing nitrogen atom-containing monomer and hydroxyl group-containing monomer, an alkoxyalkyl(meth)acrylate [for example, 2-methoxyethyl(meth)acrylate, 2-ethoxyethyl(meth)acrylate, methoxytriethylene glycol(meth)acrylate, 3-methoxypropyl(meth)acrylate, 3-ethoxypropyl(meth)acrylate, 4-methoxybutyl(meth)acrylate, 4-ethoxybutyl(meth)acrylate, etc.]; an epoxy group-containing monomer [for example, glycidyl(meth)acrylate, methylglycidyl(meth)acrylate, etc.]; a sulfonate group-containing monomer [for example, sodium vinyl sulfonate, etc.]; a phosphate group-containing monomer; a (meth)acrylic acid ester having an alicyclic hydrocarbon group [for example, cyclopentyl(meth)acrylate, cyclohexyl(meth)acrylate, isobornyl(meth)acrylate, etc.]; a (meth)acrylic acid ester having an aromatic hydrocarbon group [for example, phenyl(meth)acrylate, phenoxyethyl(meth)acrylate, benzyl(meth)acrylate, etc.]; a vinyl ester [for example, vinyl acetate, vinyl propionate, etc.]; an aromatic vinyl compound [for example, styrene, vinyltoluene, etc.]; an olefin or a diene [for example, ethylene, propylene, butadiene, isoprene, isobutylene, etc.]; a vinyl ether [for example, a vinyl alkyl ether, etc.]; and vinyl chloride.

As the copolymerizable monomer in the acrylic polymer (A), a polyfunctional monomer may also be exemplified. The polyfunctional monomer acts a cross-linking component. As the polyfunctional monomer, examples thereof include hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl(meth)acrylate, vinyl(meth)acrylate, divinylbenzene, epoxyacrylate, polyester acrylate and urethane acrylate. The polyfunctional monomer may be used either alone or in combination of two or more thereof.

Though a content (proportion) of the polyfunctional monomer in the whole of the monomer units in the acrylic polymer (A) is not particularly limited, it is preferably 0.5 wt % or less (for example, from 0 to 0.5 wt %), more preferably from 0 to 0.35 wt %, and still more preferably from 0 to 0.2 wt % in the whole of the monomer units (100 wt %) of the acrylic polymer (A). When the content of the polyfunctional monomer is 0.5 wt % or less, the pressure-sensitive adhesive layer has an appropriate cohesive force, and the pressure-sensitive adhesive force and step absorbability are liable to be enhanced, and hence, such is preferable. In the case of using a crosslinking agent, the polyfunctional monomer may not be used. However, in the case of not using the crosslinking agent, the content of the polyfunctional monomer is preferably from 0.001 to 0.5 wt %, more preferably from 0.001 to 0.35 wt %, and still more preferably from 0.002 to 0.2 wt %.

As a preferred specific embodiment of the acrylic polymer (A), examples thereof include an acrylic polymer containing, as monomer units, [1] the foregoing alkyl(meth)acrylate (preferably an alkyl(meth)acrylate having an alkyl group having from 1 to 14 carbon atoms), [2] the foregoing hydroxyl group-containing monomer (preferably a hydroxyl group-containing (meth)acrylic acid ester), and [3] the foregoing nitrogen atom-containing monomer (preferably at least one monomer selected from the group consisting of an N-vinyl cyclic amide and a (meth)acrylamide).

Among them, as a preferred specific embodiment of the acrylic polymer (A), examples thereof include an acrylic polymer containing, as monomer units, [1] the foregoing alkyl(meth)acrylate, [2] the foregoing hydroxyl group-containing monomer, and [3] the foregoing nitrogen atom-containing monomer, wherein the content of the foregoing alkyl (meth)acrylate [1] is from 30 to 95 wt % (preferably from 35 to 90 wt %, and more preferably from 40 to 85 wt %), the content of the foregoing hydroxyl group-containing monomer [2] is from 1 to 40 wt % (preferably from 2 to 35 wt %, and more preferably from 3 to 30 wt %), and the content of the foregoing nitrogen atom-containing monomer [3] is from 1 to 30 wt % (preferably from 3 to 27 wt %, and more preferably from 5 to 24 wt %), respectively, in the whole of the monomer units (100 wt %) of the acrylic polymer (A). However, it should not be construed that the acrylic polymer (A) is limited to the foregoing specific constitutions.

The acrylic polymer (A) can be prepared by polymerizing the monomer units (monomer components) with a known/conventional method. As the polymerization method of the acrylic polymer (A), examples thereof include a solution polymerization method, an emulsion polymerization method, a bulk polymerization method and a polymerization method by an active energy-ray irradiation (active energy-ray polymerization method). Among them, from the standpoint of transparency, water resistance and cost of the pressure-sensitive adhesive layer, the solution polymerization method and the active energy-ray polymerization method are preferable, and the active energy-ray polymerization method is more preferable.

As the active energy rays irradiated during the active-energy-ray polymerization (photopolymerization), examples thereof include ultraviolet rays, or ionizing radiations such as an α-ray, a β-ray, a γ-ray, a neutron ray, and an electron ray. Among them, the ultraviolet rays are preferable. Irradiation energy, irradiation time and irradiation method of active energy rays are not particularly limited as far as photopolymerization initiators can be activated to cause the reaction of monomer components.

In the polymerization of the acrylic polymer (A), various kinds of general solvents can be used. Examples of such a solvent include organic solvents such as: esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methylethylketone and methylisobutylketone. The solvents may be used either alone or in combination of two or more thereof.

In the polymerization of the acrylic polymer (A), a polymerization initiator such as a thermal polymerization initiator or a photopolymerization initiator (photoinitiator) may be used depending on a kind of polymerization reaction. The polymerization initiator may be used either alone or in combination of two or more thereof.

The photopolymerization initiator is not particularly limited, and examples thereof include a benzoin ether-based photopolymerization initiator, an acetophenon-based photopolymerization initiator, an α-ketol-based photopolymerization initiator, an aromatic sulfonylchloride-based photopolymerization initiator, a photoactive oxime-based photopolymerization initiator, a benzoin-based photopolymerization initiator, a benzyl-based photopolymerization initiator, a benzophenone-based photopolymerization initiator, a ketal-based photopolymerization initiator and a thioxanthone-based photopolymerization initiator. The photopolymerization initiator may be used either alone or in combination of two or more thereof.

Examples of the benzoin ether-based photopolymerization initiator include benzoin methyl ether, benzoin ethyl ether, benzoin propyl ether, benzoin isopropyl ether, benzoin isobutyl ether, 2,2-dimethoxy-1,2-diphenylethane-1-one and anisole methyl ether. Examples of the acetophenone-based photopolymerization initiator include 2,2-diethoxyacetophenone, 2,2-dimethoxy-2-phenylacetophenone, 1-hydroxycyclohexylphenylketone, 4-phenoxydichloroacetophenone and 4-(t-butyl)dichloroacetophenone. Examples of the α-ketol based photopolymerization initiator include 2-methyl-2-hydroxypropiophenone and 1-[4-(2-hydroxyethyl)phenyl]-2-methylpropane-1-one. Examples of the aromatic sulfonyl chloride-based photopolymerization initiator include 2-naphthalenesulfonyl chloride. Examples of the photoactive oxime-based photopolymerization initiator include 1-phenyl-1,1-propandion-2-(o-ethoxycarbonyl)-oxime. Examples of the benzoin-based photopolymerization initiator include benzoin. Examples of the benzyl-based photopolymerization initiator include benzyl. Examples of the benzophenone-based photopolymerization initiator include benzophenone, benzoyl benzoate, 3,3'-dimethyl-4-methoxybenzophenone, polyvinyl benzophenone and α-hydroxycyclohexyl phenylketone. Examples of the ketal-based photopolymerization initiator include benzyl dimethyl ketal. Examples of the thioxanthone-based photopolymerization initiator include thioxanthone, 2-chlorothioxanthone, 2-methyl thioxanthone, 2,4-dimethyl thioxanthone, isopropyl thioxanthone, 2,4-diisopropyl thioxanthone and dodecyl thioxanthone.

Though a use amount of the photopolymerization initiator is not particularly limited, for example, it is preferably from 0.001 to 1 part by weight, and more preferably from 0.01 to 0.50 parts by weight based on 100 parts by weight of the whole of the monomer units of the acrylic polymer (A) (total amount of the monomer components constituting the acrylic polymer (A)).

The thermal polymerization initiator is not particularly limited, and examples thereof include an azo-based polymerization initiator, a peroxide-based polymerization initiator (for example, dibenzoyl peroxide, tert-butylpermaleate and the like), a redox-based polymerization initiator and the like. Among the initiators, an azo-based polymerization initiator as disclosed in JP-A-2002-69411 is particularly preferable. As the azo-based polymerization initiator, examples thereof include 2,2'-azobisisobutyronitrile (hereinafter may be referred to as "AIBN"), 2,2'-azobis-2-methylbutyronitrile (hereinafter may be referred to as "AIBN"), dimethyl 2,2'-azobis(2-methylpropionate), 4,4'-azobis-4-cyanovaleric acid and the like.

Though a use amount of the thermal polymerization initiator is not particularly limited, for example, in the case of the azo-based polymerization initiator, it is preferably from 0.05 to 0.5 parts by weight, and more preferably from 0.1 to 0.3 parts by weight based on 100 parts by weight of the whole of the monomer units of the acrylic polymer (A) (total amount of the monomer components constituting the acrylic polymer (A)).

(Acrylic Polymer (B))

It is preferable that the pressure-sensitive adhesive layer of the present invention contains an acrylic polymer (B) having a weight average molecular weight of from 1,000 to 30,000 together with the acrylic polymer (A). When the pressure-sensitive adhesive layer of the present invention contains the acrylic polymer (B), the adhesive property to an adherend at an interface in the pressure-sensitive adhesive tape is enhanced. Therefore, by increasing each of the 180° peel adhesive force to a glass plate and the 180° peel adhesive force to an acrylic plate, a strong adhesive property is liable to be obtained, and an excellent anti-foaming release property is liable to be obtained. In the present specification, the "acrylic polymer (B) having a weight average molecular weight of from 1,000 to 30,000" is sometimes referred to simply as "acrylic polymer (B)".

As the acrylic polymer (B), an acrylic polymer constituted of, as an essential monomer component, a (meth)acrylic acid ester having a cyclic structure in a molecule thereof is preferably exemplified, and an acrylic polymer constituted of, as essential monomer components, a (meth)acrylic acid ester having a cyclic structure in a molecule thereof and an alkyl (meth)acrylate having a linear or branched alkyl group is more preferably exemplified. That is, as the acrylic polymer (B), an acrylic polymer containing, as a monomer unit, a (meth)acrylic acid ester having a cyclic structure in a molecule thereof is preferably exemplified, and an acrylic polymer containing, as monomer units, a (meth)acrylic acid ester having a cyclic structure in a molecule thereof and an alkyl (meth)acrylate having a linear or branched alkyl group is more preferably exemplified.

The cyclic structure (ring) of the (meth)acrylic acid ester having a cyclic structure in a molecule (one molecule) thereof (hereinafter sometimes referred to as "ring-containing (meth) acrylic acid ester") may be any one of an aromatic ring and a non-aromatic ring and is not particularly limited. Examples of the aromatic ring include an aromatic carbon ring [for example, a monocyclic carbon ring such as a benzene ring; a condensed carbon ring such as a naphthalene ring; etc.]; and various aromatic heterocyclic rings. Examples of the non-aromatic ring include a non-aromatic aliphatic ring (non-aromatic alicyclic ring) [for example, a cycloalkane ring such as a cyclopentane ring, a cyclohexane ring, a cycloheptane ring, and a cyclooctane ring; a cycloalkene ring such as a cyclohexene ring; etc.], a non-aromatic crosslinking ring [for example, a bicyclic hydrocarbon ring such as pinane, pinene, bornane, norbornane, and norbornene; a tri- or multi-cyclic aliphatic hydrocarbon ring (crosslinking hydrocarbon ring) such as adamantane; etc.], and a non-aromatic heterocyclic ring [for example, an epoxy ring, an oxolane ring, an oxetane ring, etc.].

As the tri- or multi-cyclic aliphatic hydrocarbon ring (tri- or multi-cyclic crosslinking hydrocarbon ring), examples thereof include a dicyclopentanyl group represented by the following formula (2a), a dicyclopentenyl group represented by the following formula (2b), an adamantyl group represented by the following formula (2c), a tricyclopentanyl group represented by the following formula (2d), a tricyclopentenyl group represented by the following formula (2e), and the like.

[Chem. 2]

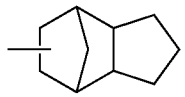

(2a)

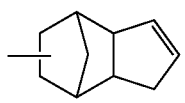

(2b)

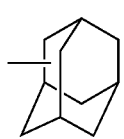

(2c)

(2d)

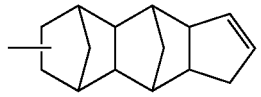

(2e)

That is, as the ring-containing (meth)acrylic acid ester, examples thereof include cycloalkyl(meth)acrylate such as cyclopentyl(meth)acrylate, cyclohexyl(meth)acrylate, cycloheptyl(meth)acrylate and cyclooctyl(meth)acrylate; (meth) acrylic acid ester having a bicyclic aliphatic hydrocarbon ring such as isobornyl(meth)acrylate; (meth)acrylic acid ester having a tri- or multi-cyclic aliphatic hydrocarbon ring such as dicyclopentanyl(meth)acrylate, dicyclopentanyloxyethyl (meth)acrylate, tricyclopentanyl(meth)acrylate, 1-adamantyl (meth)acrylate, 2-methyl-2-adamantyl(meth)acrylate and 2-ethyl-2-adamantyl(meth)acrylate; (meth)acrylic acid ester having an aromatic ring, e.g. aryl(meth)acrylate such as phenyl(meth)acrylate, aryloxyalkyl(meth)acrylate such as phenoxyethyl(meth)acrylate, arylalkyl(meth)acrylate such as benzyl(meth)acrylate. Among them, as the ring-containing (meth)acrylic acid ester, non-aromatic ring-containing (meth)acrylic acid ester is preferable, cyclohexyl acrylate (CHA), cyclohexyl methacrylate (CHMA), dicyclopentanyl acrylate (DCPA) and dicyclopetanyl methacrylate (DCPMA) are more preferable, and dicyclopentanyl acrylate (DCPA) and dicyclopetanyl methacrylate (DCPMA) are even more preferable. The ring-containing (meth)acrylic acid ester may be used either alone or in combination of two or more thereof.

Among the non-aromatic ring-containing (meth)acrylic acid esters, the (meth)acrylic acid ester having a tri- or multi-cyclic aliphatic hydrocarbon ring (particularly, tri- or multi-cyclic crosslinking hydrocarbon ring) is preferably used from the viewpoint of hardly causing polymerization inhibition. In addition, the (meth)acrylic acid ester having the dicyclopetanyl group represented by the formula (2a), the adamantyl group represented by the formula (2c), or the tricyclopentanyl group represented by the formula (2d), which do not have an unsaturated bond, is preferably used from the viewpoint that the anti-foaming release property can be more improved, and the adhesive property to a low-polarity adherend such as polyethylene or polypropylene can be largely improved.

Though a content (proportion) of the ring-containing (meth)acrylic acid ester in the whole of the monomer units of the acrylic polymer (B) (total amount of the monomer components constituting the acrylic polymer (B)) is not particularly limited, it is preferably from 10 to 90 wt %, and more preferably from 20 to 80 wt % in the whole of the monomer units (100 wt %) of the acrylic polymer (B) (in the total amount of the monomer units (100 wt %) constituting the acrylic polymer (B)). When the content of the ring-containing (meth)acrylic acid ester is 10 wt % or more, the anti-foaming release property is liable to be enhanced, and hence, such is preferable. In addition, when the content is 90 wt % or less, the pressure-sensitive adhesive layer has appropriate flexibility, and the pressure-sensitive adhesive force, step absorbability and the like are liable to be enhanced, and hence, such is preferable.

As the alkyl(meth)acrylate having the linear or branched alkyl group as the monomer unit of the acrylic polymer (B), examples thereof include alkyl(meth)acrylate having an alkyl group having 1 to 20 carbon atoms, such as methyl(meth) acrylate, ethyl(meth)acrylate, propyl(meth)acrylate, isopropyl(meth)acrylate, butyl(meth)acrylate, isobutyl(meth)acrylate, s-butyl(meth)acrylate, t-butyl(meth)acrylate, pentyl (meth)acrylate, isopentyl(meth)acrylate, hexyl(meth)

acrylate, heptyl(meth)acrylate, octyl(meth)acrylate, 2-ethylhexyl(meth)acrylate, isooctyl(meth)acrylate, nonyl (meth)acrylate, isononyl(meth)acrylate, decyl(meth)acrylate, isodecyl(meth)acrylate, undecyl(meth)acrylate, dodecyl (meth)acrylate, tridecyl(meth)acrylate, tetradecyl(meth) acrylate, pentadecyl(meth)acrylate, hexadecyl(meth) acrylate, heptadecyl(meth)acrylate, octadecyl(meth) acrylate, nonadecyl(meth)acrylat and eicosyl(meth)acrylate. Among the alkyl(meth)acrylates, methyl methacrylate (MMA) is preferable from the viewpoint of improving compatibility with the acrylic polymer (A). The alkyl(meth)acrylate may be used either alone or in combination of two or more thereof.

A content (proportion) of the alkyl(meth)acrylate having a linear or branched alkyl group in the whole of the monomer units of the acrylic polymer (B) (total amount of the monomer components constituting the acrylic polymer (B)) is not particularly limited. However, from the standpoint of the antifoaming release property, the content is preferably from 10 to 90 wt %, more preferably from 20 to 80 wt %, and still more preferably from 20 to 60 wt % in the whole of the monomer units (100 wt %) of the acrylic polymer (B) (in the total amount of the monomer units (100 wt %) constituting the acrylic polymer (B)). When the content is 10 wt % or more, in particular, the pressure-sensitive adhesive force to an adherend made of an acrylic resin or polycarbonate is liable to be enhanced, and hence, such is preferable.

As the monomer unit of the acrylic polymer (B), in addition to the ring-containing (meth)acrylic acid ester and the alkyl (meth)acrylate having a linear or branched alkyl group as described above, a monomer (copolymerizable monomer) capable of being copolymerized with such a monomer may be included. Though a content (proportion) of the copolymerizable monomer in the whole of the monomer units of the acrylic polymer (B) (total amount of the monomer components constituting the acrylic polymer (B)) is not particularly limited, it is preferably from 49.9 wt % or less (for example, from 0 to 49.9 wt %), and more preferably 30 wt % or less in the whole of the monomer units (100 wt %) of the acrylic polymer (B) (in the total amount of the monomer units (100 wt %) constituting the acrylic polymer (B)). The copolymerizable monomer may be used either alone or in combination of two or more thereof.

Examples of the copolymerizable monomer as the monomer unit of the acrylic polymer (B) (the copolymerizable monomer constituting the acrylic polymer (B)) include an alkoxyalkyl(meth)acrylate [for example, 2-methoxyethyl (meth)acrylate, 2-ethoxyethyl(meth)acrylate, methoxytriethylene glycol(meth)acrylate, 3-methoxypropyl(meth)acrylate, 3-ethoxypropyl(meth)acrylate, 4-methoxybutyl(meth) acrylate, 4-ethoxybutyl(meth)acrylate, etc.]; a carboxyl group-containing monomer [for example, (meth)acrylic acid, itaconic acid, maleic acid, fumaric acid, crotonic acid, isocrotonic acid, etc., also inclusive of an acid anhydride group-containing monomer such as maleic anhydride]; a hydroxyl group-containing monomer [for example, a hydroxyalkyl (meth)acrylate such as 2-hydroxyethyl(meth)acrylate, 3-hydroxypropyl(meth)acrylate, 4-hydroxybutyl(meth)acrylate, and 6-hydroxyhexyl(meth)acrylate, vinyl alcohol, allyl alcohol, etc.]; an amide group-containing monomer [for example, (meth)acrylamide, N,N-dimethyl(meth)acrylamide, N-methylol(meth)acrylamide, N-methoxymethyl(meth)acrylamide, N-butoxymethyl(meth)acrylamide, N-hydroxyethyl (meth)acrylamide, etc.]; an amino group-containing monomer [for example, aminoethyl(meth)acrylate, dimethylaminoethyl(meth)acrylate, t-butylaminoethyl(meth)acrylate, etc.]; a cyano group-containing monomer [for example, acrylonitrile, methacrylonitrile, etc.]; a sulfonate group-containing monomer [for example, sodium vinylsulfonate, etc.]; a phosphate group-containing monomer [for example, 2-hydroxyethyl acryloyl phosphate, etc.]; an isocyanate group-containing monomer [for example, 2-methacryloyloxyethyl isocyanate, etc.]; and an imide group-containing monomer [for example, cyclohexyl maleimide, isopropyl maleimide, etc.].

As described above, it is preferable that the acrylic polymer (B) is an acrylic polymer containing, as monomer units, a (meth)acrylic acid ester having a cyclic structure in a molecule thereof and an alkyl(meth)acrylate having a linear or branched alkyl group. Among them, the acrylic polymer (B) is preferably an acrylic polymer containing, as monomer units, a ring-containing (meth)acrylic acid ester and an alkyl (meth)acrylate having a linear or branched alkyl group as described above. In the foregoing acrylic polymer containing, as monomer units, a ring-containing (meth)acrylic acid ester and an alkyl(meth)acrylate having a linear or branched alkyl group, though a content of the ring-containing (meth)acrylic acid ester in the whole of the monomer units of the acrylic polymer (B) is not particularly limited, it is preferably from 10 to 90 wt %, and more preferably from 20 to 80 wt %. In addition, though a content of the alkyl(meth)acrylate having a linear or branched alkyl group is not particularly limited, it is preferably from 10 to 90 wt %, more preferably from 20 to 80 wt %, and still more preferably from 20 to 60 wt %.

Furthermore, as an especially preferred specific constitution of the acrylic polymer (B), examples thereof include an acrylic polymer containing, as monomer units, [1] at least one monomer selected from the group consisting of dicyclopentanyl acrylate, dicyclopentanyl methacrylate, cyclohexyl acrylate, and cyclohexyl methacrylate and [2] methyl methacrylate. In the foregoing acrylic polymer (B) as an especially preferred specific constitution, it is preferable that a content of [1] dicyclopentanyl acrylate, dicyclopentanyl methacrylate, cyclohexyl acrylate, and cyclohexyl methacrylate (in the case where two or more thereof are contained, the content refers to a total sum thereof) is from 30 to 70 wt %, and a content of [2] methyl methacrylate is from 30 to 70 wt %, in the whole of the monomer units of the acrylic polymer (B). However, it should not be construed that the acrylic polymer (B) is limited to the foregoing specific constitutions.

The acrylic polymer (B) can be obtained by polymerizing the foregoing monomer components by a known/general polymerization method. Examples of the polymerization method of the acrylic polymer (B) include a solution polymerization method, an emulsion polymerization method, a bulk polymerization method, and a polymerization method by an active energy ray irradiation (active energy ray polymerization method). Among them, a bulk polymerization method and a solution polymerization method are preferable, and a solution polymerization method is more preferable.

In the polymerization of the acrylic polymer (B), various kinds of general solvents can be used. Examples of such a solvent include organic solvents such as: esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methylethylketone and methylisobutylketone. The solvents may be used either alone or in combination of two or more thereof.

Furthermore, in the polymerization of the acrylic polymer (B), a known and general polymerization initiator (for example, a thermal polymerization initiator, a photopolymerization initiator, etc.) may be used. The polymerization initiator may be used either alone or in combination of two or more thereof.

Examples of the thermal polymerization initiator include an azo-based polymerization initiator such as 2,2'-azobisisobutyronitrile (AIBN), 2,2'-azobis-2-methylbutyronitrile (AMBN), dimethyl 2,2'-azobis(2-methylpropionate), 4,4'-azobis-4-cyanovaleric acid, 2,2'-azobis(4-methoxy-2,4-dimethylvaleronitrile), 2,2'-azobis(2,4-dimethylvaleronitrile), 1,1'-azobis(cyclohexane-1-carbonitrile), and 2,2'-azobis(2,4,4-trimethylpentane); a peroxide-based polymerization initiator such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, and 1,1-bis(t-butylperoxy)cyclododecane. In the case of performing the solution polymerization, it is preferable to use an oil-soluble polymerization initiator. In addition, the thermal polymerization initiator may be used either alone or in combination of two or more thereof.

Though a use amount of the thermal polymerization initiator is not particularly limited, for example, it is from 0.1 to 15 parts by weight based on 100 parts by weight of the whole of the monomer units of the acrylic polymer (B) (total amount of the monomer components constituting the acrylic polymer (B)).

In addition, though the photopolymerization initiator is not particularly limited, examples thereof include the same photopolymerization initiators as those used in the polymerization of the acrylic polymer (A) as exemplified above. A use amount of the photopolymerization initiator is not particularly limited and is properly chosen.

In the polymerization of the acrylic polymer (B), in order to adjust the molecular weight (specifically, in order to adjust the weight average molecular weight to from 1,000 to 30,000), a chain transfer agent may be used. Examples of the chain transfer agent include 2-mercaptoethanol, α-thioglycerol, 2,3-dimercapto-1-propanol, octyl mercaptan, t-nonyl mercaptan, dodecyl mercaptan (lauryl mercaptan), t-dodecyl mercaptan, glycidyl mercaptan, thioglycolic acid, methyl thioglycolate, ethyl thioglycolate, propyl thioglycolate, butyl thioglycolate, t-butyl thioglycolate, 2-ethylhexyl thioglycolate, octyl thioglycolate, isooctyl thioglycolate, decyl thioglycolate, dodecyl thioglycolate, a thioglycolic acid ester of ethylene glycol, a thioglycolic acid ester of neopentyl glycol, a thioglycolic acid ester of pentaerythritol, and an α-methylstyrene dimer. Among them, from the viewpoint of suppressing the whitening of the acrylic pressure-sensitive adhesive tape to be caused due to humidification, α-thioglycerol and methyl thioglycolate are preferable, and α-thioglycerol is especially preferable. The chain transfer agent may be used either alone or in combination of two or more thereof.

Though a content (use amount) of the chain transfer agent is not particularly limited, it is preferably from 0.1 to 20 parts by weight, more preferably from 0.2 to 15 parts by weight, and still more preferably from 0.3 to 10 parts by weight based on 100 parts by weight of the whole of the monomer units of the acrylic polymer (B) (total amount of the monomer components constituting the acrylic polymer (B)). By allowing the content (use amount) of the chain transfer agent to fall within the foregoing range, it is possible to easily obtain the acrylic polymer whose weight average molecular weight is controlled to from 1,000 to 30,000.

A weight average molecular weight (Mw) of the acrylic polymer (B) is from 1,000 to 30,000, preferably from 1,000 to 20,000, more preferably from 1,500 to 10,000, and still more preferably from 2,000 to 8,000. Since the weight average molecular weight of the acrylic polymer (B) is 1,000 or more, the pressure-sensitive adhesive force or maintaining property is enhanced, and the anti-foaming release property is enhanced. On the other hand, since the weight average molecular weight of the acrylic polymer (B) is 30,000 or less, the pressure-sensitive adhesive force is liable to be increased, and the anti-foaming release property is enhanced.

The weight average molecular weight (Mw) of the acrylic polymer (B) can be determined by using the GPC method and the conversion into polystyrene. For example, the weight average molecular weight can be measured using a high-performance GPC apparatus "HPLC-8120GPC", manufactured by Tosoh Corporation under the following condition.

Column: TSKGEL SUPER HZM-H/HZ4000/HZ3000/HZ2000

Solvent: Tetrahydrofuran

Flow rate: 0.6 mL/min

Though a glass transition temperature (Tg) of the acrylic polymer (B) is not particularly limited, it is preferably from 20 to 300° C., more preferably from 30 to 300° C., and still more preferably from 40 to 300° C. When the glass transition temperature of the acrylic polymer (B) is 20° C. or higher, the anti-foaming release property is liable to be enhanced, and hence, such is preferable. In addition, when the glass transition temperature of the acrylic polymer (B) is 300° C. or less, the acrylic pressure-sensitive adhesive layer has appropriate flexibility, favorable pressure-sensitive adhesive force and favorable step absorbability are liable to be obtained, and excellent adhesive reliability is liable to be obtained, and hence, such is preferable.

The glass transition temperature (Tg) of the acrylic polymer (B) is a glass transition temperature (theoretical value) expressed by the following equation.

$$1/Tg = W_1/Tg_1 + W_2/Tg_2 + \ldots + W_n/Tg_n$$

In the foregoing equation, Tg represents a glass transition temperature (unit: K) of the acrylic polymer (B); $Tg_i$ represents a glass transition temperature (unit: K) in the case of forming a homopolymer by a monomer i; and $W_i$ represents a weight fraction of the monomer i in the whole of the monomer components (i=1, 2, . . . n).

With respect to Tg of homopolymers of monomers constituting the acrylic polymer (B), values described in the following Table 1 can be adopted. In addition, with respect to Tg of homopolymers of monomers not shown in the following Table 1, numerical values described in Polymer Handbook (Third Edition, John Wiley & Sons, Inc. 1989) can be adopted. Furthermore, with respect to Tg of homopolymers of monomers which are shown in the following Table 1 and not described in the above-described document, values obtained by the foregoing measuring method (peak top temperatures of tan δ by the viscoelasticity test) can be adopted.

TABLE 1

|  | Composition | Tg (° C.) |
|---|---|---|
| Homopolymer | Methyl methacrylate (MMA) | 105 |
|  | Dicyclopentanyl methacrylate (DCPMA) | 175 |
|  | Dicyclopentanyl acrylate (DCPA) | 120 |
|  | Isobornyl methacrylate (IBXMA) | 173 |
|  | Isobornyl acrylate (IBXA) | 97 |
|  | Cyclohexyl methacrylate (CHMA) | 66 |
|  | 1-Adamantyl methacrylate (ADMA) | 250 |
|  | 1-Adamantyl acrylate (ADA) | 153 |
| Copolymer | DCPMA/MMA = 60/40 | 144 |

In Table 1, the copolymer of "DCPMA/MMA = 60/40" means a copolymer of 60 parts by weight of DCPMA and 40 parts by weight of MMA.

Though a content of the acrylic polymer (B) in the pressure-sensitive adhesive layer of the present invention is not particularly limited, it is preferably from 1 to 30 parts by weight, more preferably from 2 to 20 parts by weight, and still more preferably from 2 to 10 parts by weight based on 100 parts by weight of the acrylic polymer (A). That is, though the content of the acrylic polymer (B) in the pressure-sensitive adhesive layer of the present invention is not particularly limited, it is preferably from 1 to 30 parts by weight, more preferably from 2 to 20 parts by weight, and still more preferably from 2 to 10 parts by weight based on 100 parts by weight of the whole of the monomer units of the acrylic polymer (A). For example, in the case where the pressure-sensitive adhesive layer of the present invention is formed of an acrylic pressure-sensitive adhesive composition containing a monomer mixture or its partial polymerization product as an essential component, thought the content of the acrylic polymer (B) in the acrylic pressure-sensitive adhesive composition is not particularly limited, it is preferably from 1 to 30 parts by weight, more preferably from 2 to 20 parts by weight, and still more preferably from 2 to 10 parts by weight based on 100 parts by weight of the monomer mixture. When the content of the acrylic polymer (B) is 1 part by weight or more, excellent adhesive property and excellent anti-foaming release property are liable to be obtained, and hence, such is preferable. In addition, when the content of the acrylic polymer (B) is 30 parts by weight or less, excellent transparency and adhesive reliability are liable to be obtained, and hence, such is preferable.

In the acrylic pressure-sensitive adhesive composition forming the pressure-sensitive adhesive layer of the present invention, if necessary, known additives such as a crosslinking agent, a crosslinking accelerator, a silane coupling agent, a tackifying resin (rosin derivative, polyterpene resin, petroleum resin, and oil-soluble phenol), an anti-aging agent, a filler, a colorant (dye or pigment), a UV absorbing agent, an antioxidant, a chain-transfer agent, a plasticizer, a softener, a surfactant and an antistatic agent may be used as long as the property of the present invention is not impaired. Such an additive may be used either alone or in combination of two or more thereof.

When a crosslinking agent is contained in the acrylic pressure-sensitive adhesive composition, it is able to crosslink the acrylic polymer (especially the acrylic polymer (A)) in the pressure-sensitive adhesive layer of the present invention, thereby easily increasing the gel fraction, and hence, the anti-foaming release property is liable to be enhanced. Examples of the crosslinking agent include an isocyanate-based crosslinking agent, an epoxy-based crosslinking agent, a melamine-based crosslinking agent, a peroxide-based crosslinking agent, an urea-based crosslinking agent, a metal oxide-based crosslinking agent, a metal chelate-based crosslinking agent, a metal salt-based crosslinking agent, a carbodiimide-based crosslinking agent, an oxazoline-based crosslinking agent, an aziridine-based crosslinking agent, and an amine-based crosslinking agent. Among them, from the standpoint of an enhancement of the anti-foaming release property, an isocyanate-based crosslinking agent and an epoxy-based crosslinking agent are preferable, and an isocyanate-based crosslinking agent is more preferable. The crosslinking agent may be used either alone or in combination of two or more thereof.

As the isocyanate-based crosslinking agent (polyfunctional isocyanate compound), examples thereof include lower aliphatic polyisocyanates such as 1,2-ethylene diisocyanate, 1,4-butylenediisocyanate and 1,6-hexamethylene diisocyanate; alicyclic polyisocyanates such as cyclopentylene diisocyanate, cyclohexylene diisocyanate, isophorone diisocyanate, hydrogenated tolylene diisocyanate and hydrogenated xylene diisocyanate; and aromatic polyisocyanates such as 2,4-tolylene diisocyanate, 2,6-tolylene diisocyanate, 4,4'-diphenylmethane diisocyanate and xylylene diisocyanate. The isocyanate-based crosslinking agent may be, for example, commercially available products such as a trimethylolpropane/tolylene diisocyanate adduct (manufactured by Nippon Polyurethane Industry Co., Ltd., trade name "CORONATE L"), a trimethylolpropane/hexamethylene diisocyanate adduct (manufactured by Nippon Polyurethane Industry Co., Ltd., trade name "CORONATE HL"), a trimethylolpropane/xylylene diisocyanate adduct (manufactured by Mitsui Chemicals Co., Ltd., trade name "TAKENATE D-110N").

As the epoxy-based crosslinking agent (polyfunctional epoxy compound), examples thereof include N,N,N',N'-tetraglycidyl-m-xylenediamine, diglycidyl aniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl) isocyanurate, resorcin diglycidyl ether, bisphenol-5-diglycidyl ether and an epoxy-based resin having two or more epoxy groups in the molecule. The epoxy-based crosslinking agent may be, for example, commercially available products such as trade name "TETRAD C" manufactured by Mitsubishi Gas Chemical Company, Inc.

Though a content of the crosslinking agent in the acrylic pressure-sensitive adhesive composition is not particularly limited, it is preferably from 0.001 to 10 parts by weight, and more preferably from 0.01 to 5 parts by weight based on 100 parts by weight of the acrylic polymer (A). When the content of the crosslinking agent is 0.001 parts by weight or more, the anti-foaming release property is liable to be enhanced, and hence, such is preferable. On the other hand, when the content of the crosslinking agent is 10 parts by weight or less, the pressure-sensitive adhesive layer has appropriate flexibility, and the pressure-sensitive adhesive force is liable to be enhanced, and hence, such is preferable.

When a silane coupling agent is contained in the acrylic pressure-sensitive adhesive composition, an excellent adhesive property to a glass (in particular, excellent adhesive reliability to a glass at high temperature and high humidity) is liable to be obtained, and hence, such is preferable. Though the silane coupling agent is not particularly limited, examples thereof include γ-glycidoxypropyltrimethoxysilane, γ-glycidoxypropyltriethoxysilane, γ-aminopropyltrimethoxysilane, and N-phenyl-aminopropyltrimethoxysilane. Among them, γ-glycidoxypropyltrimethoxysilane is preferable. Furthermore, examples of the silane coupling agent include commercially available products such as a trade name "KBM-403" (manufactured by Shin-Etsu Chemical Co., Ltd.). The silane coupling agent may be used either alone or in combination of two or more thereof.

Though a content of the silane coupling agent in the acrylic pressure-sensitive adhesive composition is not particularly limited, from the standpoint of an enhancement of the adhesive reliability to a glass, it is preferably from 0.01 to 1 part by weight, and more preferably from 0.03 to 0.5 parts by weight based on 100 parts by weight of the acrylic polymer (A).

A preparation method of the acrylic pressure-sensitive adhesive composition is not particularly limited. For example, the acrylic pressure-sensitive adhesive composition containing a monomer mixture or its partial polymerization product as an essential component is prepared by adding the acrylic polymer (B) and if desired, additives or the like, to a monomer mixture or its partial polymerization product for forming the acrylic polymer (A) and mixing them.

Though the preparing method of the pressure-sensitive adhesive layer of the present invention is not particularly limited, examples thereof include a method in which the acrylic pressure-sensitive adhesive composition is coated (applied) on a substrate or a release liner, followed by drying and/or curing as the need arises.

In applying (coating) the acrylic pressure-sensitive adhesive composition, a known coating method may be adopted. For example, a coater such as a gravure roll coater, a reverse roll coater, a kiss roll coater, a dip roll coater, a bar coater, a knife coater, a spray coater, a comma coater, and a direct coater may be used.

(Other Layers)

The pressure-sensitive adhesive tape of the present invention may include, in addition to the pressure-sensitive adhesive layer of the present invention, other layers. Examples of other layers include other pressure-sensitive adhesive layer (pressure-sensitive adhesive layer other than the pressure-sensitive adhesive layer of the present invention), an interlayer, and an undercoat layer. The pressure-sensitive adhesive tape of the present invention may include two or more other layers.

(Substrate)

In the case where the pressure-sensitive adhesive tape of the present invention is a pressure-sensitive adhesive tape with substrate, the substrate is not particularly limited, but examples thereof include various optical films such as a plastic film, an antireflection (AR) film, a polarizing plate and a retardation film. As materials of the plastic film and the like, examples thereof include plastic materials such as polyester resins such as polyethylene terephthalate (PET); acrylic resins such as polymethyl methacrylate (PMMA); polycarbonate; triacetyl cellulose (TAC); polysulfone; polyarylate; polyimide; polyvinyl chloride; polyvinyl acetate; polyethylene; polypropylene; ethylene-propylene copolymer; cyclic olefin-based polymer such as trade name "ARTON (cyclic olefin-based polymer; manufactured by JSR)" and trade name "ZEONOR (cyclic olefin-based polymer; manufactured by Nippon Zeon Co., Ltd.)". The plastic materials may be used either alone or in combination of two or more thereof. The "substrate" is a part laminated to an adherend together with the pressure-sensitive adhesive layer, when the pressure-sensitive adhesive tape is laminated to the adherend. The separator (release liner) to be released in the use (lamination) of the pressure-sensitive adhesive tape is not included in the meaning of the "substrate".

The substrate is preferably a transparent substrate. The total light transmittance in a visible light wavelength region of the substrate (in accordance with JIS K7361-1) is not particularly limited, but is preferably 85% or more, and more preferably 88% or more. The haze of the substrate (in accordance with JIS K7136) is not particularly limited, but is preferably 1.5% or less, and more preferably 1.0% or less. The transparent substrate may be a PET film or a non-oriented film such as trade name "ARTON", and trade name "ZEONOR".

The thickness of the substrate is not particularly limited, but for example, is preferably 12 μm to 500 μm. The substrate may have a single layer shape or multilayer shape. On the surface of the substrate, for example, a known/general surface treatment such as a physical treatment such as a corona discharge treatment and a plasma treatment, and a chemical treatment such as an undercoat treatment, may be properly performed.

(Separator)

On the pressure-sensitive adhesive surface of the pressure-sensitive adhesive tape of the present invention, the separator (release liner) may be provided until it is used. In the case where the pressure-sensitive adhesive tape of the present invention is a double-sided pressure-sensitive adhesive tape, each pressure-sensitive adhesive surface may be protected by using separators, respectively, or protected in such a way that the surface is wound in a roll form by using one separator of which both sides are release surfaces. The separator is used as a protective material of the pressure-sensitive adhesive layer, and is peeled when the pressure-sensitive adhesive layer is laminated to the adherend. In the case where the pressure-sensitive adhesive tape of the present invention is a substrateless pressure-sensitive adhesive tape, the separator functions as a support of the pressure-sensitive adhesive layer. The separator may not be provided.

As the separator, any known release paper may be used. The separator may be, but not particularly limited to, for example, a substrate having a release treated layer, a low adhesive substrate composed of a fluorine polymer, or a low adhesive substrate composed of a non-polar polymer. As the substrate having the release treated layer, examples thereof include a plastic film or paper whose surface is treated by a release agent such as silicon type agent, long-chain alkyl type agent, fluorine type agent, or molybdenum sulfide. As the fluorine-based polymer in the low adhesive substrate composed of fluorine polymer, examples thereof include polytetrafluoroethylene, polychlorotrifluoroethylene, polyvinyl fluoride, polyvinylidene fluoride, a tetrafluoroethylene-hexafluoropropylene copolymer and a chlorofluoroethylene-vinylidene fluoride copolymer. As the non-polar polymer, examples thereof include an olefine-based resin (for example, polyethylene, polypropylene and the like). The separator can be formed by using a known/general method. The thickness of the separator is not particularly limited.

(Pressure-Sensitive Adhesive Tape of the Present Invention)

Though there are no particular limitations, it is preferable that the pressure-sensitive adhesive tape of the present invention is manufactured according to a known and general manufacturing method. For example, in the case where the pressure-sensitive adhesive tape of the present invention is a substrateless pressure-sensitive adhesive tape, it is obtained by forming the pressure-sensitive adhesive layer of the present invention on the separator by the foregoing method. In addition, in the case where the pressure-sensitive adhesive tape of the present invention is a pressure-sensitive adhesive tape with substrate, it may be obtained by forming the pressure-sensitive adhesive layer of the present invention directly on the surface of a substrate (direct application method), or it may be obtained by once forming the pressure-sensitive adhesive layer of the present invention on a separator and then transferring (laminating) the resultant onto a substrate, thereby providing the pressure-sensitive adhesive layer of the present invention on the substrate (transfer method).

The pressure-sensitive adhesive tape of the present invention includes the pressure-sensitive adhesive layer of the present invention, and hence, it is excellent in adhesive property and anti-foaming release property. Furthermore, the pressure-sensitive adhesive tape of the present invention is excellent in stress relaxation property and step followability. Accordingly, the pressure-sensitive adhesive tape of the present invention is excellent in adhesive reliability, especially adhesive reliability at high temperatures.

Accordingly, the pressure-sensitive adhesive tape of the present invention is usefully used for an adherend which is liable to cause foaming at an interface at high temperatures. For example, there may be the case where a polymethyl methacrylate resin (PMMA) contains unreacted monomers, and foaming due to an extraneous material is liable to be caused at high temperatures. In addition, polycarbonate (PC) is liable to produce water and an outgas of carbon dioxide at high temperatures. The pressure-sensitive adhesive tape of the present invention is excellent in anti-foaming release property, and hence, it is also usefully used for a plastic adherend containing such a resin.

In addition, the pressure-sensitive adhesive tape of the present invention is also usefully used for, in addition to an adherend having a small coefficient of linear expansion, an adherend having a large coefficient of linear expansion. Though the adherend having a small coefficient of linear expansion is not particularly limited, examples thereof include a glass plate (coefficient of linear expansion: from $0.3 \times 10^{-5}$ to $0.8 \times 10^{-5}/°$ C.) and a polyethylene terephthalate substrate (PET film, coefficient of linear expansion: from $1.5 \times 10^{-5}$ to $2 \times 10^{-5}/°$ C.). In addition, though the adherend having a large coefficient of linear expansion is not particularly limited, examples thereof include a resin substrate having a large coefficient of linear expansion. More specifically, examples thereof include a polycarbonate resin substrate (PC, coefficient of linear expansion: from $7 \times 10^{-5}$ to $8 \times 10^{-5}/°$ C.), a polymethyl methacrylate resin substrate (PMMA, coefficient of linear expansion: from $7 \times 10^{-5}$ to $8 \times 10^{-5}/°$ C.), a cycloolefin polymer substrate (COP, coefficient of linear expansion: from $6 \times 10^{-5}$ to $7 \times 10^{-5}/°$ C.), a trade name "ZEONOR" (manufactured by Nippon Zeon Corporation), and a trade name "ARTON" (manufactured by JSR Corporation).

The pressure-sensitive adhesive tape of the present invention is usefully used for lamination between an adherend having a small coefficient of linear expansion and an adherend having a large coefficient of linear expansion. Specifically, the pressure-sensitive adhesive tape of the present invention is preferably used for lamination between a glass substrate (for example, a glass plate, a chemically strengthened glass, a glass lens, etc.) and a resin substrate having a large coefficient of linear expansion as described above.

In this way, the pressure-sensitive adhesive tape of the present invention is usefully used for lamination between a glass adherend and a plastic adherend. The plastic adherend may also be an optical film such as a plastic film having an ITO (oxide of indium and tin) layer on the surface thereof.

Furthermore, the pressure-sensitive adhesive tape of the present invention is usefully used for, in addition to an adherend having a smooth surface, an adherend having a step on the surface thereof. In particular, even when at least one of a glass adherend and a resin substrate having a large coefficient of linear expansion as described above has a step on the surface thereof, the pressure-sensitive adhesive tape of the present invention is usefully used for lamination between the glass adherend and the resin substrate having a large coefficient of linear expansion as described above.

The pressure-sensitive adhesive tape of the present invention is preferably used for an application of manufacture of portable electronic devices. Examples of the portable electronic device include a mobile phone, PHS, a smartphone, a tablet (tablet computer), a mobile computer (mobile PC), a portable digital assistant (PDA), an electronic notebook, a portable broadcast receiver such as a portable television receiver and a portable radio receiver, a portable game machine, a portable audio player, a portable DVD player, a camera such as a digital camera, and a camcorder video camera.

The pressure-sensitive adhesive tape of the present invention is preferably used for lamination of members or modules configuring a portable electronic device to each other, fixation of a member or module configuring a portable electronic device to a housing, or the like. More specifically, examples thereof include lamination between a cover glass or lens (especially a glass lens) and a touch panel or touch sensor, fixation of a cover glass or lens (especially a glass lens) to a housing, fixation of a display panel to a housing, fixation of an input device such as a sheet keyboard and a touch panel to a housing, lamination between a protective panel of an information display part and a housing, lamination of housings to each other, lamination between a housing and a decorative sheet, and fixation or lamination of various members or modules configuring a portable electronic device. The display panel as referred to in the present specification means a structure which is configured of at least a lens (especially a glass lens) and a touch panel. In addition, the lens in the present specification is a concept including both a transparent body exhibiting a light refracting action and a transparent body not having a light refracting action. Namely, the lens in the present specification also includes a mere window panel not having a light refracting action.

Furthermore, the pressure-sensitive adhesive tape of the present invention is preferably used for an optical application. That is, the pressure-sensitive adhesive tape of the present invention is preferably an optical acrylic pressure-sensitive adhesive tape which is used for an optical application. More specifically, the pressure-sensitive adhesive tape of the present invention is preferably used for, for example, an application of laminating an optical member (use for lamination of an optical member), an application of manufacture of a product (optical product) using the foregoing optical member, or the like.

The optical member refers to a member having an optical characteristic (for example, a polarized property, a photorefractive property, a light scattering property, a light reflective property, a light transmitting property, a light absorbing property, a light diffractive property, an optical rotation property and visibility). The optical member is not particularly limited so long as the optical member is a member having the optical characteristic, and a member constituting the device (optical device) such as display device (image display device) and input device, or a member used in the device are exemplified, and examples thereof include a polarizing plate, a wave plate, a retardation plate, an optical compensation film, a brightness enhancing film, a light guide plate, a reflective film, an anti-reflective film, a transparent conductive film (e.g. plastic film having an ITO layer on the surface thereof (ITO film), and the like), a design film, a decoration film, a surface protective film, a prism, lens, a color filter, a transparent substrate, and a member in which these are laminated (collectively referred to as "a functional film" in some cases). Each of the "plate" and the "film" include a plate shape, a film shape, and a sheet shape, and for example, the "polarizing film" includes a "polarizing plate" and a "polarizing sheet".

As the display device, examples thereof include a liquid crystal display device, an organic electroluminescence (EL) display device, a plasma display panel (PDP), an electronic paper and the like. As the input device, examples thereof include a touch panel and the like.

The optical member is not particularly limited, but for example, may be a member composed of glass, acrylic resin, polycarbonate, polyethyleneterephthalate, cycloolefin polymer, a metal thin film, or the like (for example, a sheet shape, film shape or plate shape of member). As described above, the "optical member" of the present invention also includes a member (a design film, a decoration film, a surface protective film or the like) for decoration or protection while maintaining visibility of the display device or the input device as an adherend.

Though an embodiment of the lamination of an optical member by the pressure-sensitive adhesive tape of the present invention is not particularly limited, it may be (1) an embodiment of laminating optical members to each other via the pressure-sensitive adhesive tape of the present invention, (2) an embodiment of laminating an optical member to a member other than an optical member via the pressure-sensitive adhesive tape of the present invention, or (3) an embodiment of laminating the pressure-sensitive adhesive tape of the present invention containing an optical member to an optical member or a member other than an optical member. In the foregoing embodiment (3), the pressure-sensitive adhesive tape of the present invention is preferably a double-sided pressure-sensitive adhesive tape in which the substrate is an optical member (for example, an optical film, etc.).

In the case where the pressure-sensitive adhesive tape of the present invention is a pressure-sensitive adhesive tape with substrate, and the foregoing functional film is used as the substrate, the pressure-sensitive adhesive tape of the present invention can also be used as a "pressure-sensitive adhesive functional film" having the pressure-sensitive adhesive layer of the present invention on at least one side of the functional film.

EXAMPLES

The present invention is hereunder described in more detail by reference to the following Example, but it should not be construed that the present invention is limited to these Examples.

(Manufacturing Example 1 of Acrylic Polymer)

60 parts by weight of dicyclopentanyl methacrylate (DCPMA), 40 parts by weight of methyl methacrylate (MMA), 3.5 parts by weight of α-thioglycerol as a chain transfer agent, and 100 parts by weight of toluene as a polymerization solvent were put into a four-necked flask, and the contents were stirred at 70° C. for one hour in a nitrogen atmosphere. Subsequently, 0.2 parts by weight of 2,2'-azobisisobutyronitrile as a polymerization initiator was put into the four-necked flask, and the contents were allowed to react at 70° C. for 2 hours, followed by reaction at 80° C. for 2 hours. Thereafter, the reaction solution was put into an atmosphere at a temperature of 130° C., and the toluene, the chain transfer agent, and the unreacted monomers were dried and removed, thereby obtaining a solid-shaped acrylic polymer. The obtained acrylic polymer is designated as "Acrylic Polymer (B-1)".

The Acrylic Polymer (B-1) had a weight average molecular weight (Mw) of $5.1 \times 10^3$.

Example 1

A monomer mixture composed of 68 parts by weight of 2-ethylhexyl acrylate (2EHA), 14.5 parts by weight of N-vinyl-2-pyrrolidone (NVP), and 17.5 parts by weight of 2-hydroxyethyl acrylate (HEA) was blended with 0.035 parts by weight of a photopolymerization initiator (trade name: "IRGACURE 184", manufactured by BASF SE) and 0.035 parts by weight of a photopolymerization initiator (trade name: "IRGACURE 651", manufactured by BASF SE). Thereafter, the mixture was irradiated with ultraviolet rays until the viscosity (using a BH viscometer equipped with a No. 5 rotor at 10 rpm and a measuring temperature of 30° C.) reached about 20 Pa·s, thereby obtaining a prepolymer composition in which a part of the foregoing monomer components had been polymerized.

Subsequently, to the thus obtained prepolymer composition, 5 parts by weight of the foregoing Acrylic Polymer (B-1), 0.150 parts by weight of hexanediol diacrylate (HDDA), and 0.3 parts by weight of a silane coupling agent (trade name: "KBM-403", manufactured by Shin-Etsu Chemical Co., Ltd.) were added, and the contents were mixed to obtain an acrylic pressure-sensitive adhesive composition.

The foregoing acrylic pressure-sensitive adhesive composition was coated on a polyethylene terephthalate (PET) separator (trade name: "MRF50", manufactured by Mitsubishi Plastics, Inc.) such that a final thickness (thickness of the acrylic pressure-sensitive adhesive layer) was 150 μm, thereby forming a coating layer. Subsequently, on the foregoing coating layer, a PET separator (trade name: "MRF38", manufactured by Mitsubishi Plastics, Inc.) was provided to cover the coating layer, thereby blocking oxygen. Then, a laminate of MRF50/coating layer/MRF38 was obtained.

Subsequently, this laminate was irradiated with ultraviolet rays at an illuminance of 5 mW/cm$^2$ for 300 seconds from an upper surface (MRF38 side) of the laminate by a black light (manufactured by Toshiba Corporation). Furthermore, a drying treatment was carried out for 2 minutes in a dryer at 90° C. to evaporate the residual monomers. Then, a substrateless double-sided pressure-sensitive adhesive tape composed of only the acrylic pressure-sensitive adhesive layer and having a thickness of 150 μm, in which the both surfaces of the acrylic pressure-sensitive adhesive layer were protected by the separator, was obtained.

Example 2

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the hexanediol diacrylate (HDDA) to 0.100 parts by weight.

Then, a substrateless double-sided pressure-sensitive adhesive tape was obtained in the same manner as that in Example 1, except for using the thus obtained acrylic pressure-sensitive adhesive composition.

Example 3

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the hexanediol diacrylate (HDDA) to 0.075 parts by weight.

Then, a substrateless double-sided pressure-sensitive adhesive tape was obtained in the same manner as that in Example 1, except for using the thus obtained acrylic pressure-sensitive adhesive composition.

Example 4

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the hexanediol diacrylate (HDDA) to 0.050 parts by weight.

Then, a substrateless double-sided pressure-sensitive adhesive tape was obtained in the same manner as that in Example 1, except for using the thus obtained acrylic pressure-sensitive adhesive composition.

Example 5

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the hexanediol diacrylate (HDDA) to 0.025 parts by weight.

Then, a substrateless double-sided pressure-sensitive adhesive tape was obtained in the same manner as that in Example 1, except for using the thus obtained acrylic pressure-sensitive adhesive composition.

Example 6

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the Acrylic Polymer (B-1) to 2 parts by weight.

Then, a substrateless double-sided pressure-sensitive adhesive tape was obtained in the same manner as that in Example 1, except for using the thus obtained acrylic pressure-sensitive adhesive composition.

Example 7

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the Acrylic Polymer (B-1) to 2 parts by weight and also changing the addition amount of the hexanediol diacrylate (HDDA) to 0.100 parts by weight.

Then, a substrateless double-sided pressure-sensitive adhesive tape was obtained in the same manner as that in Example 1, except for using the thus obtained acrylic pressure-sensitive adhesive composition.

Example 8

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the Acrylic Polymer (B-1) to 2 parts by weight and also changing the addition amount of the hexanediol diacrylate (HDDA) to 0.075 parts by weight.

Then, a substrateless double-sided pressure-sensitive adhesive tape was obtained in the same manner as that in Example 1, except for using the thus obtained acrylic pressure-sensitive adhesive composition.

Example 9

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the Acrylic Polymer (B-1) to 0 parts by weight. The thus obtained acrylic pressure-sensitive adhesive composition did not contain the Acrylic Polymer (B-1).

Then, a substrateless double-sided pressure-sensitive adhesive tape was obtained in the same manner as that in Example 1, except for using the thus obtained acrylic pressure-sensitive adhesive composition.

Example 10

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the Acrylic Polymer (B-1) to 0 parts by weight and also changing the addition amount of the hexanediol diacrylate (HDDA) to 0.100 parts by weight. The thus obtained acrylic pressure-sensitive adhesive composition did not contain the Acrylic Polymer (B-1).

Then, a substrateless double-sided pressure-sensitive adhesive tape was obtained in the same manner as that in Example 1, except for using the thus obtained acrylic pressure-sensitive adhesive composition.

Example 11

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the Acrylic Polymer (B-1) to 0 parts by weight and also changing the addition amount of the hexanediol diacrylate (HDDA) to 0.075 parts by weight. The thus obtained acrylic pressure-sensitive adhesive composition did not contain the Acrylic Polymer (B-1).

Then, a substrateless double-sided pressure-sensitive adhesive tape was obtained in the same manner as that in Example 1, except for using the thus obtained acrylic pressure-sensitive adhesive composition.

Example 12

A monomer mixture composed of 78 parts by weight of 2-ethylhexyl acrylate (2EHA), 18 parts by weight of N-vinyl-2-pyrrolidone (NVP), and 4 parts by weight of 2-hydroxyethyl acrylate (HEA) was blended with 0.035 parts by weight of a photopolymerization initiator (trade name: "IRGACURE 184", manufactured by BASF SE) and 0.035 parts by weight of a photopolymerization initiator (trade name: "IRGACURE 651", manufactured by BASF SE). Thereafter, the mixture was irradiated with ultraviolet rays until the viscosity (using a BH viscometer equipped with a No. 5 rotor at 10 rpm and a measuring temperature of 30° C.) reached about 20 Pa·s, thereby obtaining a prepolymer composition in which a part of the foregoing monomer components had been polymerized.

Subsequently, an acrylic pressure-sensitive adhesive composition was obtained from the thus obtained prepolymer composition in the same manner as that in Example 1.

Then, a substrateless double-sided pressure-sensitive adhesive tape was obtained in the same manner as that in Example 1, except for using the thus obtained acrylic pressure-sensitive adhesive composition.

Example 13

A prepolymer composition was obtained in the same manner as that in Example 12.

Subsequently, an acrylic pressure-sensitive adhesive composition was obtained from the thus obtained prepolymer composition in the same manner as that in Example 1, except for changing the addition amount of the hexanediol diacrylate (HDDA) to 0.100 parts by weight.

Then, a substrateless double-sided pressure-sensitive adhesive tape was obtained in the same manner as that in Example 1, except for using the thus obtained acrylic pressure-sensitive adhesive composition.

Comparative Example 1

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the hexanediol diacrylate (HDDA) to 0.250 parts by weight.

Then, a substrateless double-sided pressure-sensitive adhesive tape was obtained in the same manner as that in Example 1, except for using the thus obtained acrylic pressure-sensitive adhesive composition.

Comparative Example 2

A prepolymer composition was obtained in the same manner as that in Example 1.

Subsequently, an acrylic pressure-sensitive adhesive composition was obtained from the thus obtained prepolymer composition in the same manner as that in Example 1, except for changing the addition amount of the hexanediol diacrylate (HDDA) to 0 parts by weight. The thus obtained acrylic pressure-sensitive adhesive composition did not contain the hexanediol diacrylate (HDDA).

Then, a substrateless double-sided pressure-sensitive adhesive tape was obtained in the same manner as that in Example 1, except for using the thus obtained acrylic pressure-sensitive adhesive composition.

Comparative Example 3

A monomer mixture composed of 80 parts by weight of 2-ethylhexyl acrylate (2EHA), 9 parts by weight of N-vinyl-2-pyrrolidone (NVP), and 11 parts by weight of methoxyethyl acrylate (MEA) was blended with 0.05 parts by weight of a photopolymerization initiator (trade name: "IRGACURE 184", manufactured by BASF SE) and 0.09 parts by weight of a photopolymerization initiator (trade name: "IRGACURE 651", manufactured by BASF SE). Thereafter, the mixture was irradiated with ultraviolet rays until the viscosity (using a BH viscometer equipped with a No. 5 rotor at 10 rpm and a measuring temperature of 30° C.) reached about 20 Pa·s, thereby obtaining a prepolymer composition in which a part of the foregoing monomer components had been polymerized.

Subsequently, to the thus obtained prepolymer composition, 2 parts by weight of the foregoing Acrylic Polymer (B-1), 0.100 parts by weight of dipentaerythritol hexaacrylate (DPHA), and 0.3 parts by weight of a silane coupling agent (trade name: "KBM-403", manufactured by Shin-Etsu Chemical Co., Ltd.) were added, and the contents were mixed to obtain an acrylic pressure-sensitive adhesive composition.

Then, a substrateless double-sided pressure-sensitive adhesive tape was obtained in the same manner as that in Example 1, except for using the thus obtained acrylic pressure-sensitive adhesive composition.

Comparative Example 4

A prepolymer composition was obtained in the same manner as that in Comparative Example 3.

Subsequently, an acrylic pressure-sensitive adhesive composition was obtained from the thus obtained prepolymer composition in the same manner as that in Comparative Example 3, except for changing the addition amount of the dipentaerythritol hexaacrylate (DPHA) to 0.150 parts by weight.

Then, a substrateless double-sided pressure-sensitive adhesive tape was obtained in the same manner as that in Example 1, except for using the thus obtained acrylic pressure-sensitive adhesive composition.

Comparative Example 5

A prepolymer composition was obtained in the same manner as that in Comparative Example 3.

Subsequently, an acrylic pressure-sensitive adhesive composition was obtained from the thus obtained prepolymer composition in the same manner as that in Comparative Example 3, except for changing the addition amount of the Acrylic Polymer (B-1) to 5 parts by weight.

Then, a substrateless double-sided pressure-sensitive adhesive tape was obtained in the same manner as that in Example 1, except for using the thus obtained acrylic pressure-sensitive adhesive composition.

Comparative Example 6

A prepolymer composition was obtained in the same manner as that in Comparative Example 3.

Subsequently, an acrylic pressure-sensitive adhesive composition was obtained from the thus obtained prepolymer composition in the same manner as that in Comparative Example 3, except for changing the addition amount of the Acrylic Polymer (B-1) to 5 parts by weight and also changing the addition amount of the dipentaerythritol hexaacrylate (DPHA) to 0.150 parts by weight.

Then, a substrateless double-sided pressure-sensitive adhesive tape was obtained in the same manner as that in Example 1, except for using the thus obtained acrylic pressure-sensitive adhesive composition.

Comparative Example 7

A monomer mixture composed of 90 parts by weight of 2-ethylhexyl acrylate (2EHA) and 10 parts by weight of acrylic acid (AA) was blended with 0.05 parts by weight of a photopolymerization initiator (trade name: "IRGACURE 184", manufactured by BASF SE) and 0.05 parts by weight of a photopolymerization initiator (trade name: "IRGACURE 651", manufactured by BASF SE). Thereafter, the mixture was irradiated with ultraviolet rays until the viscosity (using a BH viscometer equipped with a No. 5 rotor at 10 rpm and a measuring temperature of 30° C.) reached about 20 Pa·s, thereby obtaining a prepolymer composition in which a part of the foregoing monomer components had been polymerized.

Subsequently, to the thus obtained prepolymer composition, 0.070 parts by weight of dipentaerythritol hexaacrylate (DPHA) and 0.3 parts by weight of a silane coupling agent (trade name: "KBM-403", manufactured by Shin-Etsu Chemical Co., Ltd.) were added, and the contents were mixed to obtain an acrylic pressure-sensitive adhesive composition.

Then, a substrateless double-sided pressure-sensitive adhesive tape was obtained in the same manner as that in Example 1, except for using the thus obtained acrylic pressure-sensitive adhesive composition.

(Evaluation)

Each of the substrateless double-sided pressure-sensitive adhesive tapes of the Examples and Comparative Examples was measured or evaluated in the following manners. The evaluation results are shown in Table 1.

(1) Total Light Transmittance and Haze:

One of the separators of the double-sided pressure-sensitive adhesive tape was peeled off, the resulting double-sided pressure-sensitive adhesive tape was laminated to a slide glass ("SHIROKENMA NO. 1", manufactured by Matsunami Glass Ind. Ltd., thickness: from 0.8 to 1.0 mm, total light transmittance: 92%, haze: 0.2%). Furthermore, the other separator was peeled off, thereby preparing a test piece having a layer configuration of double-sided pressure-sensitive adhesive tape (acrylic pressure-sensitive adhesive layer)/slide glass.

The foregoing test piece was measured for a total light transmittance in a visible light region and a haze by using a haze meter (apparatus name: "HM-150", manufactured by Murakami Color Research Laboratory Co., Ltd.).

(2) Gel Fraction:

A gel fraction of the acrylic pressure-sensitive adhesive layer of the double-sided pressure-sensitive adhesive tape was measured in accordance with the foregoing "Method for measuring gel fraction".

(3) 300% Tensile Residual Stress:

A sheet piece having a length of 40 mm and a width of 40 mm was cut out from the double-sided pressure-sensitive adhesive tape. Subsequently, the separator was peeled off from the sheet piece, and thereafter, the sheet piece was rolled up in a cylindrical shape in the width direction, which was then used as a measuring sample.

The measuring sample was set on a tensile tester (apparatus name: "AUTOGRAPH AG-IS", manufactured by Shimadzu Corporation) such that a distance between chucks (distance between grippers) was 20 mm.

The measuring sample was drawn by 60 mm (elongation: 300%) at a temperature of 23° C. and a tensile speed of 200 mm/min, and the elongation was kept. The distance between the chucks after drawing was 80 mm.

Then, after fixing (keeping) the measuring sample for 300 seconds after completion of drawing, a tensile load applied to the measuring sample was determined, and the tensile load was divided by an initial cross-sectional area (cross-sectional area before drawing) of the measuring sample, thereby determining a 300% tensile residual stress (N/cm$^2$).

(4) 180° Peel Adhesive Force (180° Peel Adhesive Force to Glass Plate and 180° Peel Adhesive Force to Acrylic Plate):

A sheet piece having a length of 100 mm and a width of 20 mm was cut out from the double-sided pressure-sensitive adhesive tape. Subsequently, one of the separators was peeled off from the sheet piece, and the resulting sheet piece was laminated to (backed with) a PET film (trade name: "LUMIRROR S-10", thickness: 25 μm). Subsequently, the other separator was peeled off, and the resulting laminate was contact-bonded to a test plate by moving a 2-kg roller back and forth once and then aged in an atmosphere at 23° C. and 50% RH for 30 minutes. After aging, the pressure-sensitive adhesive tape was peeled off from the test plate by using a tensile tester (apparatus name: "AUTOGRAPH AG-IS", manufactured by Shimadzu Corporation) in an atmosphere at 23° C. and 50% RH under conditions at a tensile speed of 300 mm/min and a peel angle of 180° in conformity with JIS Z0237, thereby measuring a 180° peel adhesive force (N/20 mm).

As the test plate, a glass plate (trade name: "SODA LIME GLASS #0050", manufactured by Matsunami Glass Ind. Ltd.) and an acrylic plate (trade name: "ACRYLITE MR-200", manufactured by Mitsubishi Rayon Co., Ltd.) were used.

(5) Step Followability:

One of the separators of the double-sided pressure-sensitive adhesive tape was peeled off, and the double-sided pressure-sensitive adhesive tape was contact-bonded and laminated to the surface of a film, in which an ITO (oxide of indium and tin) layer had been provided on one surface of a cycloolefin (COP) substrate (trade name: "ZEONOR", manufactured by Nippon Zeon Corporation, thickness: 100 μm) (hereinafter referred to as "COP-ITO film), on the side of the ITO layer, by moving a 2-kg roller back and forth once. Then, Structure A having a laminated structure of the COP-ITO film and the double-sided pressure-sensitive adhesive tape was obtained.

Figure 2:
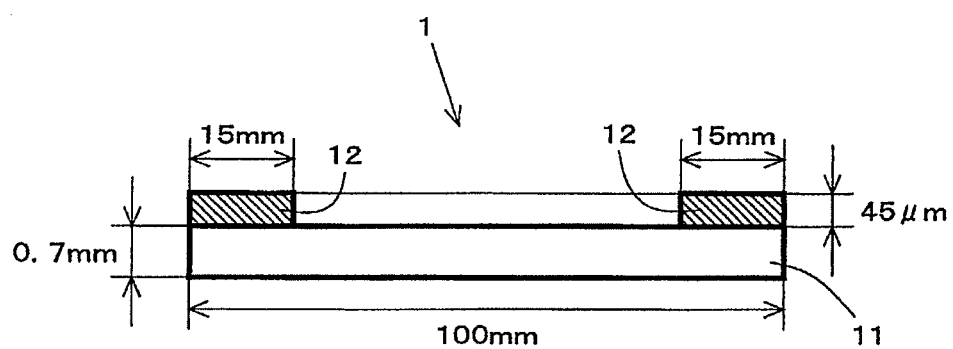
FIG. 2 is a cross-sectional view (A-A' line cross-sectional view) of a glass with step.
Figure 3:
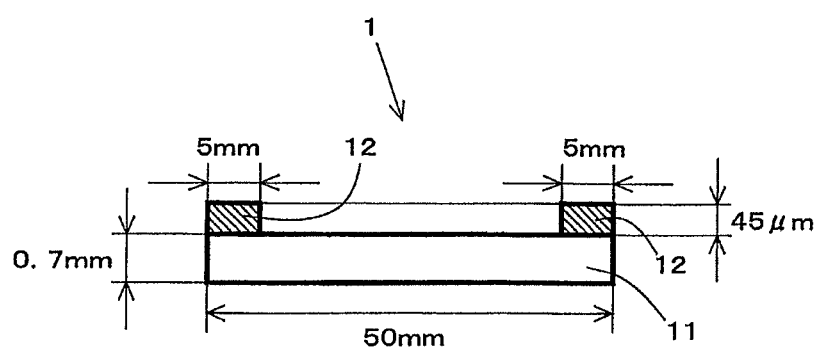
FIG. 3 is a cross-sectional view (B-B' line cross-sectional view) of a glass with step.

Subsequently, the separator of the double-sided pressure-sensitive adhesive tape in the Structure A was peeled off, and the Structure A was contact-bonded and laminated to the surface of a glass with step (see FIGS. 1, 2 and 3), on the side where the step was present, by moving a 2-kg roller back and forth once. Then, Structure B having a laminated structure of the COP-ITO film, the double-sided pressure-sensitive adhesive tape, and the glass with step was obtained.

After allowing the Structure B to stand, the Structure B was put into an autoclave and subjected to an autoclave treatment under conditions at a temperature of 50° C. under a pressure of 0.5 MPa for 15 minutes.

After the autoclave treatment, the Structure B was taken out from the autoclave. The Structure B was put into a dryer set up at 85° C. and then allowed to stand for 24 hours.

Thereafter, the Structure B was taken out from the dryer and then allowed to stand in an atmosphere at 23° C. and 50% RH for 30 minutes.

Then, the double-sided adhesive tape in the vicinity of the step in the Structure B was visually observed and evaluated according to the following criteria.

(Evaluation Criteria)

A: The double-sided pressure-sensitive adhesive tape follows up the step, and lift-off is not observed.

B: The double-side pressure-sensitive adhesive tape cannot follow up the step, and lift-off is observed.

The foregoing glass with step is configured of a glass plate and a step. The step is provided by applying framework-shaped printing onto the glass plate. Namely, the step is provided by a printing ink.

(6) Anti-Foaming Release Property:

Structure B was obtained in the same manner as in the foregoing "(5) Step followability". Thereafter, the Structure B was allowed to stand in an atmosphere at 23° C. and 50% RH for one hour.

After allowing the Structure B to stand, the Structure B was put into an autoclave and subjected to an autoclave treatment under conditions at a temperature of 50° C. under a pressure of 0.5 MPa for 15 minutes.

After the autoclave treatment, the Structure B was taken out from the autoclave. The Structure B was put into a dryer set up at 85° C. and then allowed to stand for 24 hours.

Thereafter, the Structure B was taken out from the dryer and then allowed to stand in an atmosphere at 23° C. and 50% RH for 30 minutes. Then, the presence or absence of foaming (foaming including foaming to be caused due to an extraneous material) or release in the Structure B was observed by a microscope. Then, the anti-foaming release property was evaluated according to the following evaluation criteria.

(Evaluation Criteria)

A: Foaming or release is not observed at all.

B: Foaming to be caused due to only an extraneous material having a size of 100 μm or more is observed.

C: Foaming to be caused due to an extraneous material having a size of less than 100 μm is observed.

D: Foaming or release is observed irrespective of the presence or absence of an extraneous material.

TABLE 2

| | Acrylic pressure-sensitive adhesive composition | | | | | |
|---|---|---|---|---|---|---|
| | Composition of monomer mixture | Acrylic Polymer (B-1) [parts by weight] | Crosslinking component [parts by weight] | | Silane coupling agent [parts by weight] | Thickness [μm] | Total light transmission [%] |
| Example 1 | 2EHA/NVP/HEA = 68/14.5/17.5 | 5 | HDDA | 0.150 | 0.3 | 150 | 92.3 |
| Example 2 | 2EHA/NVP/HEA = 68/14.5/17.5 | 5 | HDDA | 0.100 | 0.3 | 150 | 92.3 |
| Example 3 | 2EHA/NVP/HEA = 68/14.5/17.5 | 5 | HDDA | 0.075 | 0.3 | 150 | 92.3 |
| Example 4 | 2EHA/NVP/HEA = 68/14.5/17.5 | 5 | HDDA | 0.050 | 0.3 | 150 | 92.3 |
| Example 5 | 2EHA/NVP/HEA = 68/14.5/17.5 | 5 | HDDA | 0.025 | 0.3 | 150 | 92.3 |
| Example 6 | 2EHA/NVP/HEA = 68/14.5/17.5 | 2 | HDDA | 0.150 | 0.3 | 150 | 92.3 |
| Example 7 | 2EHA/NVP/HEA = 68/14.5/17.5 | 2 | HDDA | 0.100 | 0.3 | 150 | 92.3 |
| Example 8 | 2EHA/NVP/HEA = 68/14.5/17.5 | 2 | HDDA | 0.075 | 0.3 | 150 | 92.3 |
| Example 9 | 2EHA/NVP/HEA = 68/14.5/17.5 | 0 | HDDA | 0.150 | 0.3 | 150 | 92.2 |
| Example 10 | 2EHA/NVP/HEA = 68/14.5/17.5 | 0 | HDDA | 0.100 | 0.3 | 150 | 92.2 |
| Example 11 | 2EHA/NVP/HEA = 68/14.5/17.5 | 0 | HDDA | 0.075 | 0.3 | 150 | 92.3 |
| Example 12 | 2EHA/NVP/HEA = 78/18/4 | 5 | HDDA | 0.150 | 0.3 | 150 | 92.4 |
| Example 13 | 2EHA/NVP/HEA = 78/18/4 | 5 | HDDA | 0.100 | 0.3 | 150 | 92.5 |
| Comparative Example 1 | 2EHA/NVP/HEA = 68/14.5/17.5 | 5 | HDDA | 0.250 | 0.3 | 150 | 92.3 |
| Comparative Example 2 | 2EHA/NVP/HEA = 68/14.5/17.5 | 5 | — | — | 0.3 | 150 | 92.3 |
| Comparative Example 3 | 2EHA/NVP/MEA = 80/9/11 | 2 | DPHA | 0.100 | 0.3 | 150 | 92.4 |
| Comparative Example 4 | 2EHA/NVP/MEA = 80/9/11 | 2 | DPHA | 0.150 | 0.3 | 150 | 92.4 |
| Comparative Example 5 | 2EHA/NVP/MEA = 80/9/11 | 5 | DPHA | 0.100 | 0.3 | 150 | 92.4 |
| Comparative Example 6 | 2EHA/NVP/MEA = 80/9/11 | 5 | DPHA | 0.150 | 0.3 | 150 | 92.5 |
| Comparative Example 7 | 2EHA/AA = 90/10 | 0 | DPHA | 0.070 | 0.3 | 150 | 92.3 |

| | Haze [%] | Gel fraction [%] | 300% tensile residual stress [N/cm$^2$] | 180° peel adhesive force [N/20 mm] | | Step followability | Anti-foaming release property |
|---|---|---|---|---|---|---|---|
| | | | | Glass plate | Acrylic plate | | |
| Example 1 | 0.4 | 89 | 13.2 | 16 | 15 | A | A |
| Example 2 | 0.4 | 88 | 12.5 | 17 | 16 | A | A |
| Example 3 | 0.4 | 86 | 10.8 | 19 | 16 | A | A |
| Example 4 | 0.4 | 84 | 9.5 | 18 | 16 | A | A |
| Example 5 | 0.4 | 77 | 8.7 | 18 | 16 | A | A |
| Example 6 | 0.5 | 92 | 14.5 | 15 | 15 | A | A |
| Example 7 | 0.5 | 91 | 12.8 | 16 | 15 | A | A |
| Example 8 | 0.5 | 88 | 11.4 | 17 | 15 | A | A |
| Example 9 | 0.5 | 94 | 14.0 | 15 | 15 | A | B |
| Example 10 | 0.6 | 93 | 13.2 | 15 | 15 | A | B |
| Example 11 | 0.5 | 90 | 11.4 | 16 | 15 | A | B |
| Example 12 | 0.3 | 89 | 9.6 | 14 | 14 | A | C |
| Example 13 | 0.4 | 86 | 7.5 | 15 | 14 | A | C |
| Comparative Example 1 | 0.4 | 90 | 17.1 | 15 | 15 | B | A |
| Comparative Example 2 | 0.4 | 63 | 7.6 | 18 | 16 | A | D |
| Comparative Example 3 | 0.3 | 68 | 2.6 | 10 | 11 | A | D |
| Comparative Example 4 | 0.3 | 77 | 4.4 | 7 | 8 | A | D |

TABLE 2-continued

| | | | | | | |
|---|---|---|---|---|---|---|
| Comparative Example 5 | 0.3 | 64 | 2.1 | 12 | 14 | A | D |
| Comparative Example 6 | 0.3 | 74 | 3.8 | 10 | 10 | A | D |
| Comparative Example 7 | 0.3 | 67 | 4.6 | 18 | 14 | A | D |

The pressure-sensitive adhesive tapes of the Examples are excellent in adhesive property and excellent in step followability, and furthermore, are excellent in anti-foaming release property. Accordingly, the pressure-sensitive adhesive tapes of the Examples are excellent in adhesive reliability.

While the invention has been described in detail and with reference to specific embodiments thereof, it will be apparent to one skilled in the art that various changes and modifications can be made therein without departing from the spirit and scope thereof.

This application is based on Japanese Patent Application No. 2012-022615 filed on Feb. 6, 2012, the entire subject matter of which is incorporated herein by reference.

The present invention provides the following acrylic pressure-sensitive adhesive tape.

(1) An acrylic pressure-sensitive adhesive tape comprising an acrylic pressure-sensitive adhesive layer, wherein
a 180° peel adhesive force of the acrylic pressure-sensitive adhesive tape to a glass plate is 10 N/20 mm or more,
a 180° peel adhesive force of the acrylic pressure-sensitive adhesive tape to an acrylic plate is 10 N/20 mm or more,
the acrylic pressure-sensitive adhesive layer contains an acrylic polymer (A),
the acrylic pressure-sensitive adhesive layer has a gel fraction of 65% or more, and
the acrylic pressure-sensitive adhesive layer has a 300% tensile residual stress of from 7 to 16 N/cm$^2$.

(2) The acrylic pressure-sensitive adhesive tape according to (1), wherein the acrylic polymer (A) contains, as a monomer unit, a monomer having a hydroxyl group in a molecule thereof.

(3) The acrylic pressure-sensitive adhesive tape according to (1) or (2), wherein the acrylic pressure-sensitive adhesive layer further contains an acrylic polymer (B) having a weight average molecular weight of from 1,000 to 30,000.

(4) The acrylic pressure-sensitive adhesive tape according to any one of (1) to (3), which is an optical pressure-sensitive adhesive tape.

DESCRIPTION OF REFERENCE NUMERALS AND SIGNS

1: Glass with step (piece for step test)
11: Glass plate
12: Step

What is claimed is:

1. An acrylic pressure-sensitive adhesive tape comprising an acrylic pressure-sensitive adhesive layer, wherein
a 180° peel adhesive force of the acrylic pressure-sensitive adhesive tape to a glass plate is 10 N/20 mm or more,
a 180° peel adhesive force of the acrylic pressure-sensitive adhesive tape to an acrylic plate is 10 N/20 mm or more,
the acrylic pressure-sensitive adhesive layer contains an acrylic polymer (A) and an acrylic polymer (B) having a weight average molecular weight of from 1,000 to 30,000,
the acrylic polymer (B) comprises, as a monomer component, a (meth)acrylic acid ester having a tri- or multi-cyclic aliphatic hydrocarbon in a molecule thereof,
the acrylic pressure-sensitive adhesive layer has a gel fraction of 65% or more, and
the acrylic pressure-sensitive adhesive layer has a 300% tensile residual stress of from 7 to 16 N/cm$^2$.

2. The acrylic pressure-sensitive adhesive tape according to claim 1, wherein the acrylic polymer (A) contains, as a monomer unit, a monomer having a hydroxyl group in a molecule thereof.

3. The acrylic pressure-sensitive adhesive tape according to claim 1, which is an optical pressure-sensitive adhesive tape.

4. The acrylic pressure-sensitive adhesive tape according to claim 2, which is an optical pressure-sensitive adhesive tape.

* * * * *